United States Patent
Budagavi

(10) Patent No.: US 10,708,603 B2
(45) Date of Patent: *Jul. 7, 2020

(54) REDUCED COMPLEXITY COEFFICIENT TRANSMISSION FOR ADAPTIVE LOOP FILTERING (ALF) IN VIDEO CODING

(71) Applicant: Texas Instruments Incorporated, Dallas, TX (US)

(72) Inventor: Madhukar Budagavi, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/144,446

(22) Filed: Sep. 27, 2018

(65) Prior Publication Data
US 2019/0028717 A1  Jan. 24, 2019

Related U.S. Application Data

(63) Continuation of application No. 13/858,920, filed on Apr. 8, 2013, now Pat. No. 10,129,540.

(Continued)

(51) Int. Cl.
| | | |
|---|---|---|
| *H04N 19/176* | (2014.01) | |
| *H04N 19/13* | (2014.01) | |
| *H04N 19/463* | (2014.01) | |
| *H04N 19/167* | (2014.01) | |
| *H04N 19/80* | (2014.01) | |

(52) U.S. Cl.
CPC .......... *H04N 19/176* (2014.11); *H04N 19/13* (2014.11); *H04N 19/167* (2014.11); *H04N 19/463* (2014.11); *H04N 19/80* (2014.11)

(58) Field of Classification Search
CPC ............ B60C 11/0302; B60C 11/0309; B60C 11/0332; B60C 11/04; B60C 11/11; B60C 11/12; B60C 11/1236; B60C 11/13; B60C 11/1369; B60C 2011/0341; B60C 2011/0344; B60C 2011/0346;
(Continued)

(56) References Cited

U.S. PATENT DOCUMENTS

2004/0114683 A1* 6/2004 Schwarz ............ H03M 7/4006
375/240.2
2007/0126853 A1* 6/2007 Ridge .................. H04N 19/176
348/14.01
(Continued)

OTHER PUBLICATIONS

Benjamin Bross et al, "High Efficiency Video Coding (HEVC) Text Specification Draft 9", JCTVC-K1003_v13, Joint Collaborative Team on Video Coding (JCT-VC) of ITU-T SG16 WP3 and ISO/IEC JTC1/SC29/WG11, pp. 1-293, Oct. 10-19, 2012, Shanghai, China.
(Continued)

*Primary Examiner* — James M Anderson, II
(74) *Attorney, Agent, or Firm* — Ebby Abraham; Charles A. Brill; Frank D. Cimino

(57) ABSTRACT

A method for adaptive loop filtering is provided that includes determining a coefficient value for each coefficient position of an adaptive loop filter, applying the adaptive loop filter to at least a portion of a reconstructed picture using the coefficient values, and entropy encoding coefficient values into a compressed bit stream using predetermined short binary codes, wherein the short binary code used depends on the coefficient position of the coefficient value.

16 Claims, 18 Drawing Sheets

Related U.S. Application Data

(60) Provisional application No. 61/661,997, filed on Jun. 20, 2012, provisional application No. 61/623,323, filed on Apr. 12, 2012, provisional application No. 61/622,237, filed on Apr. 10, 2012.

(58) Field of Classification Search
CPC ..... B60C 2011/0365; B60C 2011/0369; B60C 2011/0393; B60C 2011/1213; B60C 2011/1268; H04N 19/00066; H04N 19/13; H04N 19/167; H04N 19/176; H04N 19/463; H04N 19/80
USPC .................................................. 375/240.02
See application file for complete search history.

(56) References Cited

U.S. PATENT DOCUMENTS

| | | | | |
|---|---|---|---|---|
| 2007/0217703 | A1* | 9/2007 | Kajiwara | H04N 19/50 382/238 |
| 2007/0292039 | A1* | 12/2007 | Kadono | H04N 19/176 382/246 |
| 2009/0054026 | A1* | 2/2009 | Miller | H04B 1/123 455/266 |
| 2010/0002946 | A1* | 1/2010 | Dikbas | H04N 19/147 382/251 |
| 2010/0020867 | A1* | 1/2010 | Wiegand | H04N 19/34 375/240.02 |
| 2010/0097248 | A1* | 4/2010 | Sze | H03M 7/4006 341/51 |
| 2010/0254463 | A1* | 10/2010 | Narroschke | H04N 19/147 375/240.29 |
| 2010/0290533 | A1* | 11/2010 | Minagawa | H03M 7/40 375/240.23 |
| 2011/0080947 | A1* | 4/2011 | Chen | H04N 19/13 375/240.12 |
| 2011/0142136 | A1* | 6/2011 | Liu | G06T 5/20 375/240.18 |
| 2011/0298890 | A1* | 12/2011 | Bacche | H04N 9/78 348/43 |
| 2012/0121012 | A1* | 5/2012 | Shiodera | H04N 19/176 375/240.03 |
| 2012/0236939 | A1* | 9/2012 | Filippini | H04N 19/70 375/240.14 |
| 2012/0268178 | A1* | 10/2012 | Reddy | H03F 3/45179 327/157 |
| 2012/0281749 | A1* | 11/2012 | Ikai | H04N 19/46 375/240.02 |
| 2013/0113880 | A1* | 5/2013 | Zhao | H04N 19/70 348/43 |
| 2013/0259118 | A1* | 10/2013 | Fu | H04N 19/169 375/240.02 |
| 2014/0010278 | A1* | 1/2014 | Lou | H04N 19/61 375/240.02 |
| 2014/0355695 | A1* | 12/2014 | Lim | H04N 19/82 375/240.29 |

OTHER PUBLICATIONS

Madhukar Budagavi et al, "HEVC ALF Decode Complexity Analysis and Reduction", 2011 18th IEEE International Conference on Image Processing (ICIP), pp. 733-736, Sep. 11-14, 2011, Brussels, Belgium.

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, pp. 1-215, Mar. 16-23, 2011, Geneva, Switzerland.

"Quadtree-Based Adaptive Loop Filter", COM16-C181-E, International Telecommunication Union (ITU)—Telecommunication Standardization Sector, Study Group 16, Contribution 181, Question 6116, pp. 1-4, Jan. 2009.

"Adaptive (Wiener) Filter for Video Compression", COM16-C437R1-E, International Telecommunication Union (ITU)—Telecommunication Standardization Sector, Study Group 16, Contribution 437, Question 6116, pp. 1-7, Apr. 2008.

"TMS320DM6467 Digital Media System-on-Chip", SPRS403G, Texas Instruments Incorporated, Dec. 2007, revised Oct. 2010, pp. 1-355.

Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, pp. 1-249, Jul. 11-20, 2012, Stockholm, Sweden.

Marta Karczewicz et al, "A Hybrid Video Coder Based on Extended Macroblock Sizes, Improved Interpolation and Flexible Motion Representation", IEEE Transactions on Circuits and Systems for Video Technology, vol. 20, Issue 12, pp. 1698-1708, Dec. 2010.

Takeshi Chujoh et al, "Block-Based Adaptive Loop Filter", VCEG-A118, International Telecommunication (ITU)—Telecommunication Standardization Sector, Study Group 16, Question 6, pp. 1-7, Jul. 16-18, 2008, Berlin, Germany.

Benjamin Bross et al, "High Efficiency Video Coding (HEVC) Text Specification Draft 7", JCTVC-I1003_d1, Joint Collaborative Team on Video Coding (JCT-VC) of ITU-T SG16 WP3 and ISO/IEC JTC1/SC29/WG11, pp. 1-256, Apr. 27-May 7, 2012, Geneva, Switzerland.

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, pp. 1-249, Nov. 21-30, 2011, Geneva, Switzerland.

Madhukar Budagavi, "Simplification of ALF Filter Coefficients Coding", JCTVC-I0346, Joint Collaborative Team on Video Coding (JCT-VC) of ITU-T SG16 WP3 and ISO/IEC JTC1/SC29/WG11, pp. 1-9, Apr. 27-May 7, 2012, Geneva, Switzerland.

Madhukar Budagavi, "Simplification of ALF Filter Coefficients Coding", JCTVC-I0346 Presentation, Joint Collaborative Team on Video Coding (JCT-VC) of ITU-T SG16 WP3 and ISO/IEC JTC1/SC29/WG11, pp. 1-8, Apr. 27-May 7, 2012, Geneva, Switzerland.

Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, pp. 1-214, Jul. 14-22, 2011, Torino, Italy.

Benjamin Bross et al, "WD5: Working Draft 5 of High-Efficiency Video Coding", JCTVC-G1103_d9, Joint collaborative Team on Video Coding (JCT-VC) of ITU-T SG16 WP3 and ISO/IEC JTC1/SC29/WG11, pp. 1-223, Nov. 21-30, 2011, Geneva, Switzerland.

Madhukar Budagavi, "ALF Filter Coefficients Distribution and Modifications to Coding", JCWC-I0381, oint Collaborative Team on Video Coding (JCT-VC) of ITU-T SG16 WP3 and ISO/IEC JTC1/SC29/WG11, pp. 1-5, Apr. 27-May 7, 2012, Geneva, Switzerland.

* cited by examiner

REDUCED COMPLEXITY COEFFICIENT TRANSMISSION FOR ADAPTIVE LOOP FILTERING (ALF) IN VIDEO CODING

CROSS-REFERENCE TO RELATED APPLICATIONS

This application is a continuation of U.S. patent application Ser. No. 13/858,920, filed Apr. 8, 2013 which claims benefit of U.S. Provisional Patent Application Ser. No. 61/622,237, filed Apr. 10, 2012, U.S. Provisional Patent Application Ser. No. 61/623,323, filed Apr. 12, 2012, and U.S. Provisional Patent Application Ser. No. 61/661,997, filed Jun. 20, 2012, which are incorporated herein by reference in their entirety.

BACKGROUND OF THE INVENTION

Field of the Invention

Embodiments of the present invention generally relate to encoding and decoding of adaptive loop filter coefficients in video coding.

Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). HEVC is expected to provide around 50% improvement in coding efficiency over the current standard, H.264/AVC, as well as larger resolutions and higher frame rates. To address these requirements, HEVC utilizes larger block sizes then H.264/AVC. In HEVC, the largest coding unit (LCU) can be up to 64×64 in size, while in H.264/AVC, the macroblock size is fixed at 16×16.

Adaptive loop filtering (ALF) is a new coding tool proposed for HEVC. In general, ALF is an adaptive Wiener filtering technique applied after the deblocking filter to improve the reference picture used for encoding/decoding of subsequent pictures. The original ALF concept is explained in more detail in Y. Chiu and L. Xu, "Adaptive (Wiener) Filter for Video Compression," ITU-T SG16 Contribution, C437, Geneva, CH, April 2008. As originally proposed, ALF used square filters and was carried out on entire deblocked pictures. Subsequently, block-based adaptive loop filtering was proposed in which ALF could be enabled and disabled on a block, i.e., coding unit, basis. In block-based ALF, the encoder signals to the decoder the map of blocks of a deblocked picture on which ALF is to be applied. Block-based ALF is described in more detail in T. Chujoh, et al., "Block-based Adaptive Loop Filter," ITU-T SG16 Q.6 Document, VCEG-A118, Berlin, DE, July 2008.

A further refinement to block-based ALF, quadtree adaptive loop filtering, was subsequently proposed in which the map of blocks was signaled using a quadtree. Quadtree ALF is described in more detail in T. Chujoh, et al., "Quadtree-based Adaptive Loop Filter," ITU-T SG16 Contribution, C181, January 2009. The use of diamond shaped rather than square shaped ALF filters was then proposed to reduce computational complexity. Diamond shaped ALF filters for luma components are described in more detail in M. Karczewicz, et al., "A Hybrid Video Coder Based on Extended Macroblock Sizes, Improved Interpolation, and Flexible Motion Representation," IEEE Trans. on Circuits and Systems for Video Technology, pp. 1698-1708, Vol. 20, No. 12, December 2010.

SUMMARY

Embodiments of the present invention relate to methods and apparatus for adaptive loop filtering in video coding. In one aspect, a method for adaptive loop filtering is provided that includes determining a coefficient value for each coefficient position of an adaptive loop filter, applying the adaptive loop filter to at least a portion of a reconstructed picture using the coefficient values, and entropy encoding coefficient values into a compressed bit stream using predetermined short binary codes, wherein the short binary code used depends on the coefficient position of the coefficient value.

In one aspect, a method for adaptive loop filtering is provided that includes entropy decoding coefficient values from a compressed video bit stream using predetermined short binary codes, wherein the short binary code used depends on the coefficient position of the coefficient value, and applying the adaptive loop filter to at least a portion of a reconstructed picture using the coefficient values.

In one aspect, an apparatus configured to perform adaptive loop filtering is provided that includes means for determining a coefficient value for each coefficient position of an adaptive loop filter, means for applying the adaptive loop filter to at least a portion of a reconstructed picture using the coefficient values, and means for entropy encoding coefficient values into a compressed bit stream using predetermined short binary codes, wherein the short binary code used depends on the coefficient position of the coefficient value.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
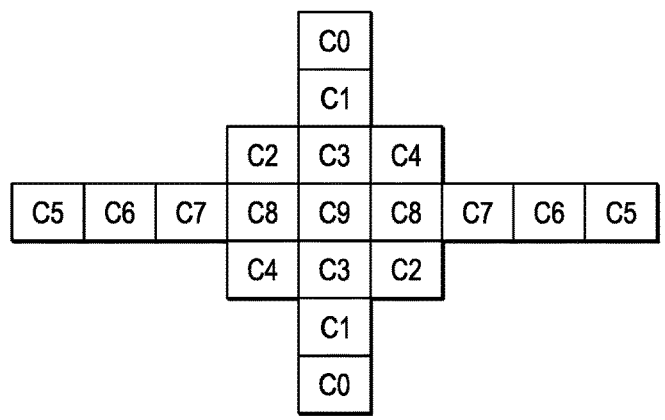
FIG. 1 is an example of an adaptive loop filter (ALF)

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, and 32×32. The sizes of the transforms units and prediction units for a CU are determined by the video encoder during prediction based on minimization of rate/distortion costs.

Some aspects of this disclosure have been presented to the JCT-VC in the following documents: JCTVC-I0381, entitled "ALF Filter Coefficients Distribution and Modifications to Coding", Apr. 7, 2012-May 7, 2012, and JCTVC-I0346, entitled "Simplification of ALF Filter Coefficients Coding, Apr. 7, 2012-May 7, 2012. These documents are incorporated by reference herein in their entirety.

As previously discussed, adaptive loop filtering (ALF) is a new coding tool proposed in HEVC. As currently proposed, ALF uses a 10-tap symmetric two-dimensional (2D) filter as shown in FIG. 1. The filter coefficients C0, C1, . . . , C9 are predicted and transmitted as follows. Up to sixteen ALF filter sets may be transmitted for the luma component of an LCU in addition to one ALF filter set each for the two chroma components of the LCU. Two types of prediction have been proposed to reduce the bit rate for ALF coefficient transmission—intra filter prediction and inter filter prediction. Further, two types of intra filter prediction are proposed—prediction of the filter coefficient C8 and prediction of the filter coefficient C9. Intra filter prediction of C8 and inter filter prediction were observed to provide no bit rate savings and are expected to be removed. The description below describes the prior art assuming that intra filter prediction of C8 and inter filter prediction are not used.

Figure 2:
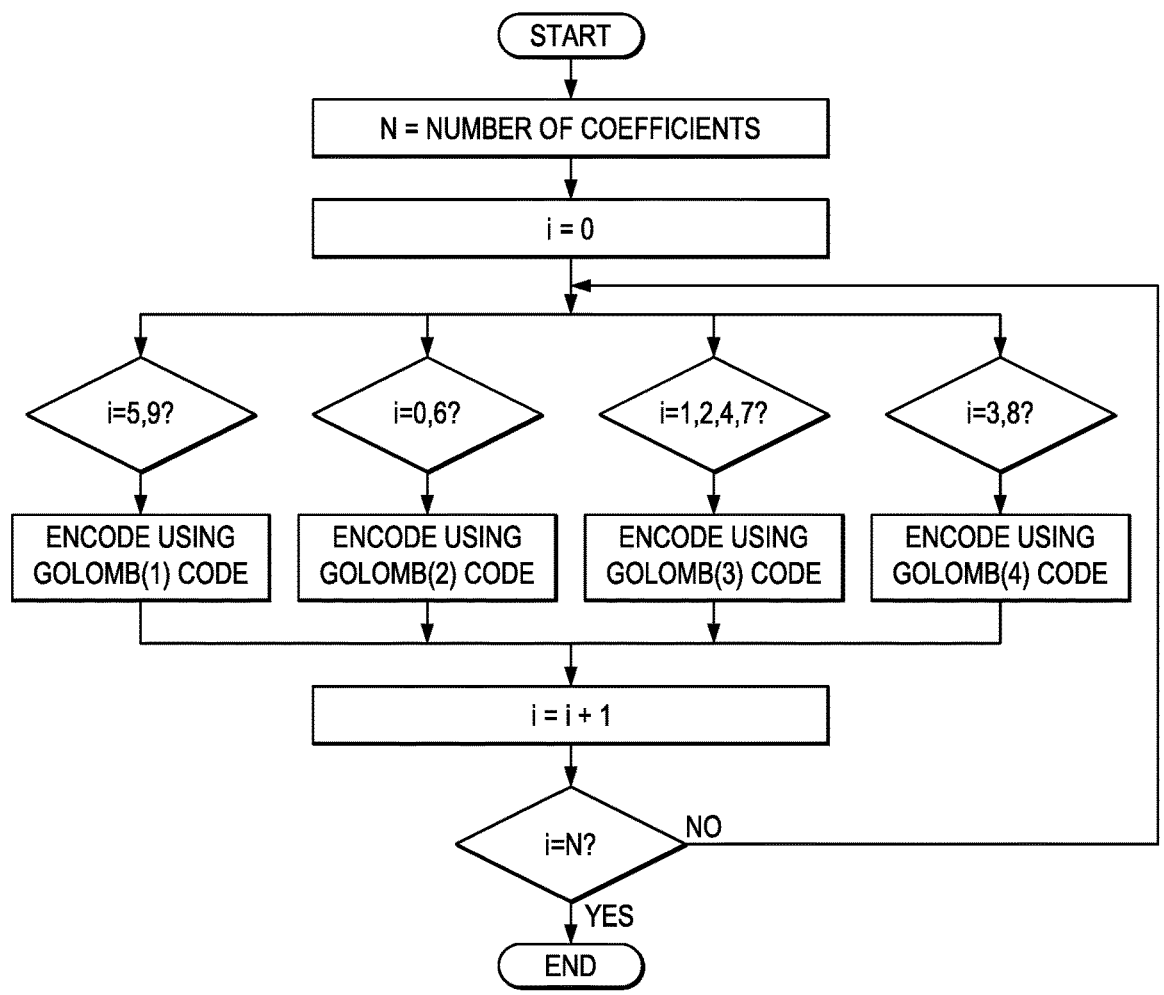
FIG. 2 is a flow diagram of a prior art method for encoding the coefficient values of the filter of FIG. 1.

The ALF filter coefficients are encoded in the compressed bit stream using Golomb-code using fixed k-parameters for each coefficient. Table 1 shows the k parameter values for each ALF filter coefficient, the value range of each coefficient, and the worst case codeword length for each coefficient. FIG. 2 is a flow chart illustrating the entropy coding of the ALF coefficients using Golomb code and the values of k specified in Table 2. There are two issues with using this coding scheme: 1) the entropy coding is filter position dependent and changes from coefficient to coefficient; and 2) the worst case codeword length for each coefficient is very large, e.g., as much as 131 bits for k=1. Variable length decoding of such large code words is difficult for 32- and 64-bit processors.

TABLE 1

| Syntax element | Filter coefficient | Coefficient value range | Golomb (k) k | Max length (in bits) |
|---|---|---|---|---|
| alf_filt_coeff[0] | C0 | −256 to 255 | 2 | 68 |
| alf_filt_coeff[1] | C1 | −256 to 255 | 3 | 37 |
| alf_filt_coeff[2] | C2 | −256 to 255 | 3 | 37 |
| alf_filt_coeff[3] | C3 | −256 to 255 | 4 | 22 |
| alf_filt_coeff[4] | C4 | −256 to 255 | 3 | 37 |
| alf_filt_coeff[5] | C5 | −256 to 255 | 1 | 131 |
| alf_filt_coeff[6] | C6 | −256 to 255 | 2 | 68 |
| alf_filt_coeff[7] | C7 | −256 to 255 | 3 | 37 |
| alf_filt_coeff[8] | C8 | −256 to 255 | 4 | 22 |
| alf_filt_coeff[9] | C9 | 0 to 511 | 1 | 258 |

Embodiments of the invention provide for simplification of the coding of the ALF filter coefficients. In some embodiments, the ALF filter is constrained to be unit gain filter such that the value of C9 can be derived from the values of C0 . . . C8, thus eliminating the need to transmit C9 in the encoded bit stream. In some embodiments, coefficient position independent entropy coding techniques are used. In some embodiments, coefficient position dependent entropy coding techniques with smaller worst case codeword lengths are used. In some embodiments, coefficient position dependent entropy coding techniques using exp-Golomb codes in which the value of k may vary by coefficient position are used. In some embodiments, coefficient position dependent entropy coding techniques using a combination of exp-Golomb codes and fixed length codes are used. In some embodiments, a bias is subtracted from ALF filter coefficients before the coefficients are entropy coded.

Figure 3:
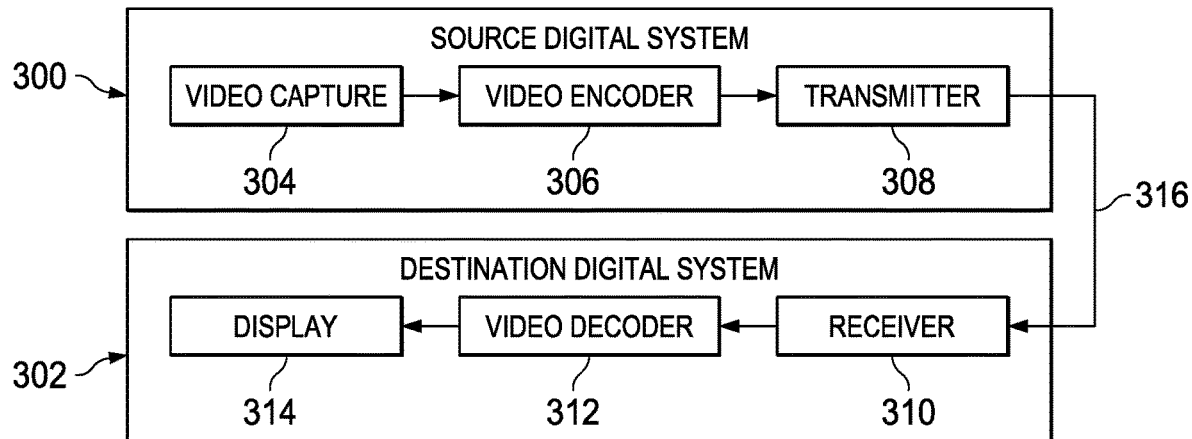
FIG. 3 is a block diagram of a digital system.

FIG. 3 shows a block diagram of a digital system that includes a source digital system 300 that transmits encoded video sequences to a destination digital system 302 via a communication channel 316. The source digital system 300 includes a video capture component 304, a video encoder component 306, and a transmitter component 308. The video capture component 304 is configured to provide a video sequence to be encoded by the video encoder component 306. The video capture component 304 may be, for example, a video camera, a video archive, or a video feed from a video content provider. In some embodiments, the video capture component 304 may generate computer graphics as the video sequence, or a combination of live video, archived video, and/or computer-generated video.

The video encoder component 306 receives a video sequence from the video capture component 304 and encodes it for transmission by the transmitter component 308. The video encoder component 306 receives the video sequence from the video capture component 304 as a sequence of pictures, divides the pictures into largest coding units (LCUs), and encodes the video data in the LCUs. The video encoder component 306 may be configured to apply adaptive loop filter coefficient encoding techniques during the encoding process as described herein. An embodiment of the video encoder component 306 is described in more detail herein in reference to FIG. 4.

The transmitter component 308 transmits the encoded video data to the destination digital system 302 via the communication channel 316. The communication channel 316 may be any communication medium, or combination of communication media suitable for transmission of the encoded video sequence, such as, for example, wired or wireless communication media, a local area network, or a wide area network.

The destination digital system 302 includes a receiver component 310, a video decoder component 312 and a display component 314. The receiver component 310 receives the encoded video data from the source digital system 300 via the communication channel 316 and provides the encoded video data to the video decoder component 312 for decoding. The video decoder component 312 reverses the encoding process performed by the video encoder component 306 to reconstruct the LCUs of the video sequence. The video decoder component 312 may be configured to apply adaptive loop filter coefficient decoding techniques during the decoding process as described herein. An embodiment of the video decoder component 312 is described in more detail below in reference to FIG. 5.

The reconstructed video sequence is displayed on the display component 314. The display component 314 may be any suitable display device such as, for example, a plasma display, a liquid crystal display (LCD), a light emitting diode (LED) display, etc.

In some embodiments, the source digital system 300 may also include a receiver component and a video decoder component and/or the destination digital system 302 may include a transmitter component and a video encoder component for transmission of video sequences both directions for video steaming, video broadcasting, and video telephony. Further, the video encoder component 306 and the video decoder component 312 may perform encoding and decoding in accordance with one or more video compression standards. The video encoder component 306 and the video decoder component 312 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 4:
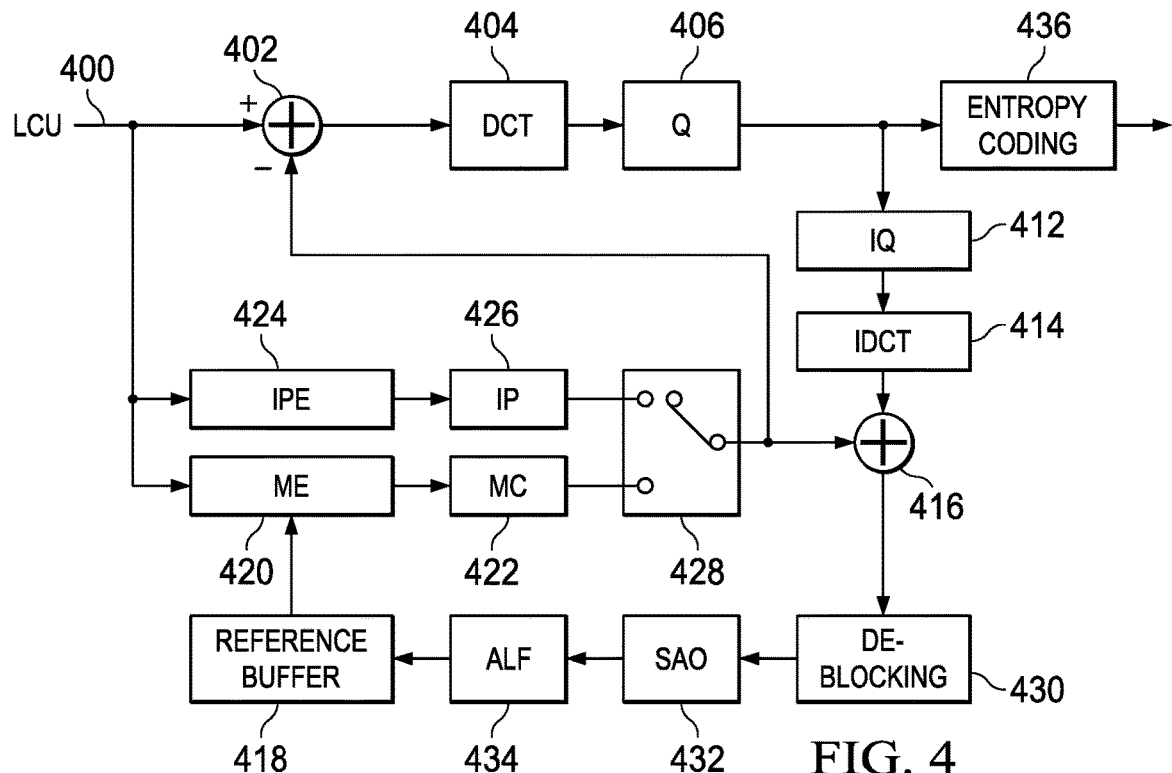
FIG. 4 is a block diagram of a video encoder.

FIG. 4 is a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCU processing receives LCUs 400 of the input video sequence from the coding control component and encodes the LCUs 400 under the control of the coding control component to generate the compressed video stream. The LCUs 400 in each picture are processed in row order. The LCUs 400 from the coding control component are provided as one input of a motion estimation component (ME) 420, as one input of an intra-prediction estimation component (IPE) 424, and to a positive input of a combiner 402 (e.g., adder or subtractor or the like). Further, although not specifically shown, the prediction mode of each picture as selected by the coding control component is provided to a mode decision component 428 and the entropy coding component 436.

The storage component 418 provides reference data to the motion estimation component 420 and to the motion compensation component 422. The reference data may include one or more previously encoded and decoded pictures, i.e., reference pictures.

The motion estimation component 420 provides motion data information to the motion compensation component 422 and the entropy coding component 436. More specifically, the motion estimation component 420 performs tests on CUs in an LCU based on multiple inter-prediction modes (e.g., skip mode, merge mode, and normal or direct inter-prediction), PU sizes, and TU sizes using reference picture data from storage 418 to choose the best CU partitioning, PU/TU partitioning, inter-prediction modes, motion vectors, etc. based on coding cost, e.g., a rate distortion coding cost. To perform the tests, the motion estimation component 420 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 420 provides the motion vector (MV) or vectors and the prediction mode for each PU in the selected CU partitioning to the motion compensation component (MC) 422.

The motion compensation component 422 receives the selected inter-prediction mode and mode-related information from the motion estimation component 420 and generates the inter-predicted CUs. The inter-predicted CUs are provided to the mode decision component 428 along with the selected inter-prediction modes for the inter-predicted PUs and corresponding TU sizes for the selected CU/PU/TU partitioning. The coding costs of the inter-predicted CUs are also provided to the mode decision component 428.

The intra-prediction estimation component 424 (IPE) performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. To perform the tests, the intra-prediction estimation component 424 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 424 provides the selected intra-prediction modes for the PUs, and the corresponding TU sizes for the selected CU partitioning to the intra-prediction component (IP) 426.

The coding costs of the intra-predicted CUs are also provided to the intra-prediction component 426.

The intra-prediction component 426 (IP) receives intra-prediction information, e.g., the selected mode or modes for the PU(s), the PU size, etc., from the intra-prediction estimation component 424 and generates the intra-predicted CUs. The intra-predicted CUs are provided to the mode decision component 428 along with the selected intra-prediction modes for the intra-predicted PUs and corresponding TU sizes for the selected CU/PU/TU partitioning. The coding costs of the intra-predicted CUs are also provided to the mode decision component 428.

The mode decision component 428 selects between intra-prediction of a CU and inter-prediction of a CU based on the intra-prediction coding cost of the CU from the intra-prediction component 426, the inter-prediction coding cost of the CU from the motion compensation component 422, and the picture prediction mode provided by the coding control component. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 436.

The output of the mode decision component 428, i.e., the predicted PUs, is provided to a negative input of the combiner 402 and to the combiner 438. The associated transform unit size is also provided to the transform component 404. The combiner 402 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 404 performs block transforms on the residual CUs to convert the residual pixel values to transform coefficients and provides the transform coefficients to a quantize component 406. More specifically, the transform component 404 receives the transform unit sizes for the residual CU and applies transforms of the specified sizes to the CU to generate transform coefficients. Further, the quantize component 406 quantizes the transform coefficients based on quantization parameters (QPs) and quantization matrices provided by the coding control component and the transform sizes and provides the quantized transform coefficients to the entropy coding component 436 for coding in the bit stream.

The entropy coding component 436 entropy encodes the relevant data, i.e., syntax elements, output by the various encoding components and the coding control component using context-adaptive binary arithmetic coding (CABAC) to generate the compressed video bit stream. Among the syntax elements that are encoded are picture parameter sets, flags indicating the CU/PU/TU partitioning of an LCU, the prediction modes for the CUs, and the quantized transform coefficients for the CUs. The entropy coding component 436 also codes relevant data from the in-loop filters (described below) such as the adaptive loop filter (ALF) coefficients for each picture. Methods for encoding ALF coefficients that may be used by the entropy coding component 436 are described below in reference to FIGS. 6, 8, 10, 12, 14, 16, and 20.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 412, which outputs a reconstructed version of the transform result from the transform component 404. The dequantized transform coefficients are provided to the inverse transform component (IDCT) 414, which outputs estimated residual information representing a reconstructed version of a residual CU. The inverse transform component 414 receives the transform unit size used to generate the transform coefficients and applies inverse transform(s) of the specified size to the transform coefficients to reconstruct the residual values. The reconstructed residual CU is provided to the combiner 438.

The combiner 438 adds the original predicted CU to the residual CU to generate a reconstructed CU, which becomes part of reconstructed picture data. The reconstructed picture data is stored in a buffer (not shown) for use by the intra-prediction estimation component 424.

Various in-loop filters may be applied to the reconstructed picture data to improve the quality of the reference picture data used for encoding/decoding of subsequent pictures. The in-loop filters may include a deblocking filter component 430, a sample adaptive offset filter (SAO) component 432, and an adaptive loop filter (ALF) component 434. The in-loop filters 430, 432, 434 are applied to each reconstructed LCU in the picture and the final filtered reference picture data is provided to the storage component 418.

The ALF component 434 selectively applies a symmetric 2D finite impulse response (FIR) filter of the shape shown in FIG. 1 to blocks of the reconstructed picture. In general, for a given block, the ALF component 434 determines a set of filter coefficients, and applies the filter to the block using the set of filter coefficients. The filter parameters are determined using a standard Weiner filtering technique in which the objective is to determine parameters such that the mean squared error between the original input pixels and the filtered reconstructed pixels is minimized. As part of determining the filter coefficients, the ALF component 434 may apply a coding cost versus error decrease analysis to decide whether or not a particular block is to be filtered. Thus, some blocks may be not be filtered. The sets of filter coefficients and information regarding whether to filter a particular block are provided to the entropy coding component 436 to be encoded in the bit stream. Information regarding which coefficients sets are to be used for which blocks can be derived at both the encoder and the decoder based on block statistics (e.g., variance) or based on the picture region in which the block resides.

Figure 5:
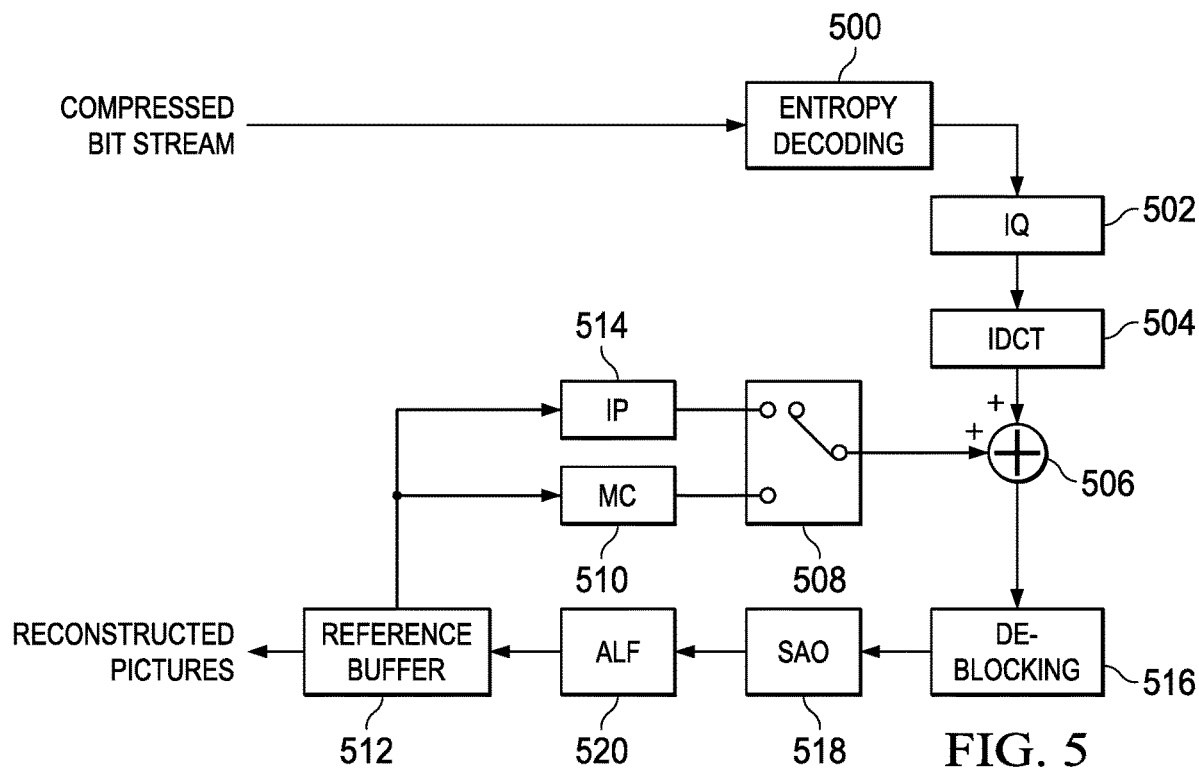
FIG. 5 is a block diagram of a video decoder.

FIG. 5 is a block diagram of an example video decoder. The video decoder operates to reverse the encoding operations, i.e., entropy coding, quantization, transformation, and prediction, performed by the video encoder of FIG. 4 to regenerate the pictures of the original video sequence. In view of the above description of a video encoder, one of ordinary skill in the art will understand the functionality of components of the video decoder without detailed explanation.

The entropy decoding component 500 receives an entropy encoded (compressed) video bit stream and reverses the entropy encoding using CABAC decoding to recover the encoded syntax elements, e.g., CU, PU, and TU structures of LCUs, quantized transform coefficients for CUs, motion vectors, prediction modes, ALF coefficients, etc. The decoded syntax elements are passed to the various components of the decoder as needed. For example, decoded prediction modes are provided to the intra-prediction component (IP) 514 or motion compensation component (MC) 510. If the decoded prediction mode is an inter-prediction mode, the entropy decoder 500 reconstructs the motion vector(s) as needed and provides the motion vector(s) to the motion compensation component 510. In another example, decoded ALF coefficients are provided to the ALF component 520. Methods for decoding ALF coefficients that may be used by the entropy decoding component 500 are described below in reference to FIGS. 7, 9, 11, 13, 15, 17, and 21.

The inverse quantize component (IQ) 502 de-quantizes the quantized transform coefficients of the CUs. The inverse transform component 504 transforms the frequency domain data from the inverse quantize component 502 back to the residual CUs. That is, the inverse transform component 504 applies an inverse unit transform, i.e., the inverse of the unit transform used for encoding, to the de-quantized residual coefficients to produce reconstructed residual values of the CUs.

A residual CU supplies one input of the addition component 506. The other input of the addition component 506 comes from the mode switch 508. When an inter-prediction mode is signaled in the encoded video stream, the mode switch 508 selects predicted PUs from the motion compensation component 510 and when an intra-prediction mode is signaled, the mode switch selects predicted PUs from the intra-prediction component 514.

The motion compensation component 510 receives reference data from the storage component 512 and applies the motion compensation computed by the encoder and transmitted in the encoded video bit stream to the reference data to generate a predicted PU. That is, the motion compensation component 510 uses the motion vector(s) from the entropy decoder 500 and the reference data to generate a predicted PU.

The intra-prediction component 514 receives reconstructed samples from previously reconstructed PUs of a current picture from the storage component 512 and performs the intra-prediction computed by the encoder as signaled by an intra-prediction mode transmitted in the encoded video bit stream using the reconstructed samples as needed to generate a predicted PU.

The addition component 506 generates a reconstructed CU by adding the predicted PUs selected by the mode switch 508 and the residual CU. The output of the addition component 506, i.e., the reconstructed CUs, is stored in the storage component 512 for use by the intra-prediction component 514.

In-loop filters may be applied to reconstructed picture data to improve the quality of the decoded pictures and the quality of the reference picture data used for decoding of subsequent pictures. The applied in-loop filters are the same as those of the encoder, i.e., a deblocking filter 516, a sample adaptive offset filter (SAO) 518, and an adaptive loop filter (ALF) 520. The in-loop filters may be applied on an LCU-by-LCU basis and the final filtered reference picture data is provided to the storage component 512.

The ALF component 520 applies the same symmetric 2D FIR filter of the same shape to blocks of the reconstructed picture using the sets of coefficients signaled in the compressed bit stream. More specifically, for each block in a reconstructed picture, the ALF component 520 applies the filter using the filter coefficients determined for that block by the encoder.

Various methods for entropy encoding ALF filter coefficients together with corresponding methods for entropy decoding are now described. These methods assume the symmetric filter of FIG. 1. One of ordinary skill in art, having benefit of this disclosure, will understand embodiments for other filter shapes and/or embodiments in which ALF uses multiple filter shapes. In general, the symmetric filter shape may be a diamond, circle, star, cross, or any other general shape bounded by a (2V+1)×(2H+1) rectangle where V is the vertical dimension of the filter and H is the horizontal dimension of the filter. In practice, the filter shape or shapes to be used are defined by the video coding standard, e.g., HEVC.

As previously mentioned, as currently defined in HEVC, ALF filter coefficients are encoded in the bit stream using Golomb coding of order k where the value of k is dependent of the coefficient position. As is well known, Golomb coding uses the parameter k to divide an input value into two parts: the quotient of a division by k, and the remainder of the division by k. The quotient is encoded using unary coding and the remainder is encoded using binary encoding. More specifically, the output of G(k) coding as used in HEVC is a three part code word that includes a unary prefix of one bits, a binary suffix, and a separator between the prefix and suffix that is a single zero bit. To encode a non-negative integer n using a Golomb code of order k, the quotient q and remainder r of n with respect to $2^k$ is calculated as shown in Eq. (1) and Eq. (2), respectively. Note that r corresponds to the k least-significant bits of the binary representation of n, and q corresponds to the other, most-significant, bits. The codeword for n consists of a prefix of q one bits, the single zero bit separator, and a suffix of k bits containing the binary representation of r. Further, the length of the codeword for n is q+1+k.

$$q = n >> k \quad (1)$$

$$r = n - q*2^k \quad (2)$$

The use of Golomb coding with the values of k specified by HEVC can result in very large worst case codeword lengths.

FIGS. 6, 8, 10, 12, and 14 are flow diagrams of methods for encoding the filter coefficients with a smaller worst case codeword length, and FIGS. 7, 9, 11, 13, and 15 are flow diagrams of corresponding methods for decoding the filter coefficients. One of ordinary skill in the art, having benefit of the disclosure herein, will understand the decoding methods without need for additional description. The methods use exponential Golomb (exp-Golomb) codes, or exp-Golomb codes in combination with truncated unary (TU) or fixed length codes (FLC). Similar to Golomb codes, exp-Golomb codes are indexed by a non-negative integer value k. Furthermore, the output of the particular EG(k) coding used is a three part code word that includes a unary prefix of one bits, a binary suffix, and a separator between the prefix and suffix that is a single zero bit. More specifically, to encode a non-negative integer n using an exp-Golomb code of order k, the number of one bits q in the prefix of the codeword may be calculated as shown in Eq. (3) and the value r of the suffix may be calculated as shown in Eq. (4). The length of the suffix is q+k. The codeword for n consists of a prefix q one bits, the single zero bit separator, and a suffix of q+k bits containing the binary representation of r. The codeword may also be obtained directly as the binary representation of the sum $n+2^k$, zero-extended by q bits. Further, the length of the codeword for n is 2q+k+1.

$$q = \log_2((n+2^k) >> k) \quad (3)$$

$$r = n + 2^k - 2^{q+k} \quad (4)$$

Exp-Golomb coding of integers m with negative and non-negative values can be carried out by mapping the negative and non-negative values of m into positive values n. An example mapping is as follows:
mapping from m to n:
if(m<=0) n=−2*m
else n=2*m−1
mapping from n to m:
if (n & 0x1) m=(n+1)/2
else m=−n/2.

In truncated unary (TU) coding, if an integer value x to be coded is less than a truncated value S, the coded result is x continuous "1" bits followed by a terminating "0" bit. Otherwise, the coded result is S continuous "1" bits. For example, let S=3. If x=2, the coded result is "110". If x=3, the coded result is "111". In fixed length coding (FLC) of order S, each code word has a fixed bit length of S.

Figure 6:
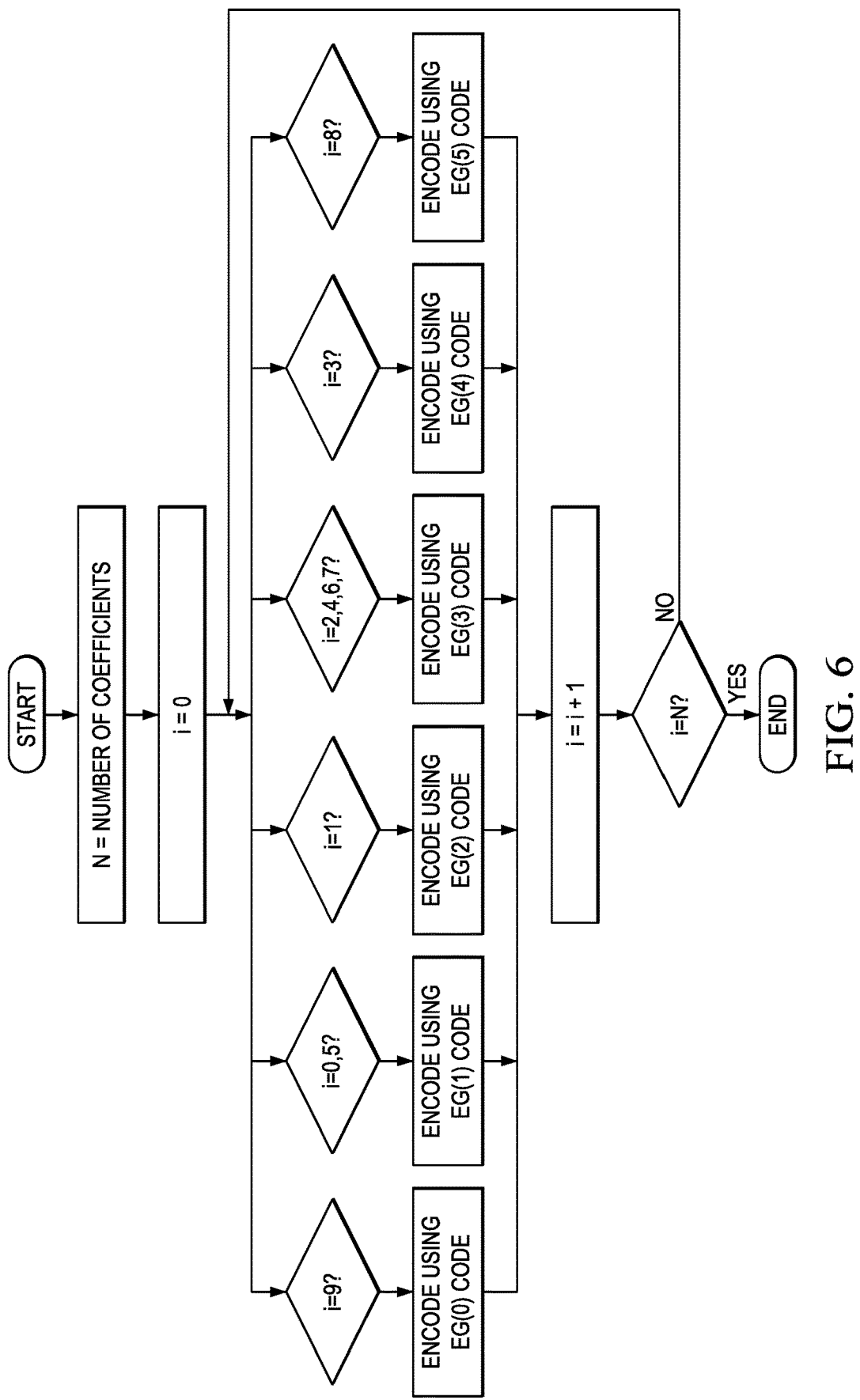
FIGS. 6-17 and 20-23 are flow diagrams of methods.
Figure 7:
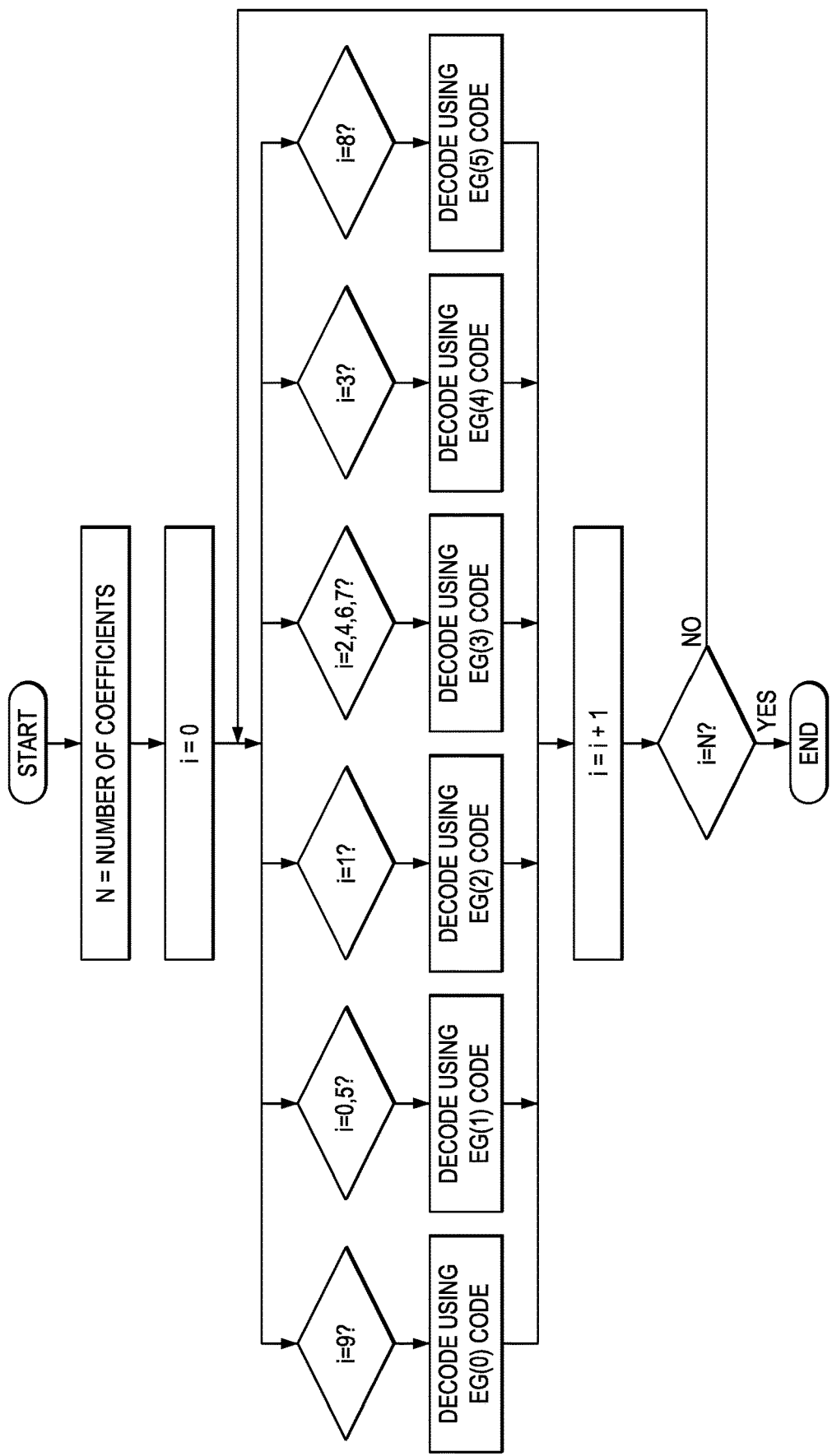

FIG. 6 is a flow diagram of a method for encoding ALF filter coefficients using coefficient position dependent short codes, i.e., exp-Golomb codes of order k=0, . . . , 5, where the value of k depends on the position of a coefficient. FIG. 7 is a flow diagram of the corresponding method for decoding ALF filter coefficients encoded using the method of FIG. 6. Table 2 shows the value of k for each coefficient position and the maximum codeword length for the coefficient position. The particular values of k shown in FIGS. 6 and 7 and in Table 2 for each coefficient position are examples. Other suitable values may be used. For example, values for k may be determined based on the probability distribution of the values of coefficients C0 . . . C9 for a representative test set. Distributions with fatter tails may be assigned larger values of k while distributions which are peaked around a value (typically 0) may be assigned smaller values of k. The probability distribution of a coefficient position can be overlaid by the corresponding probability distribution of the variable length code (obtained as $2^{Li}$ where Li is the length of codeword i) for different values of k and the k with the best corresponding distribution selected for the coefficient position.

Figure 8:
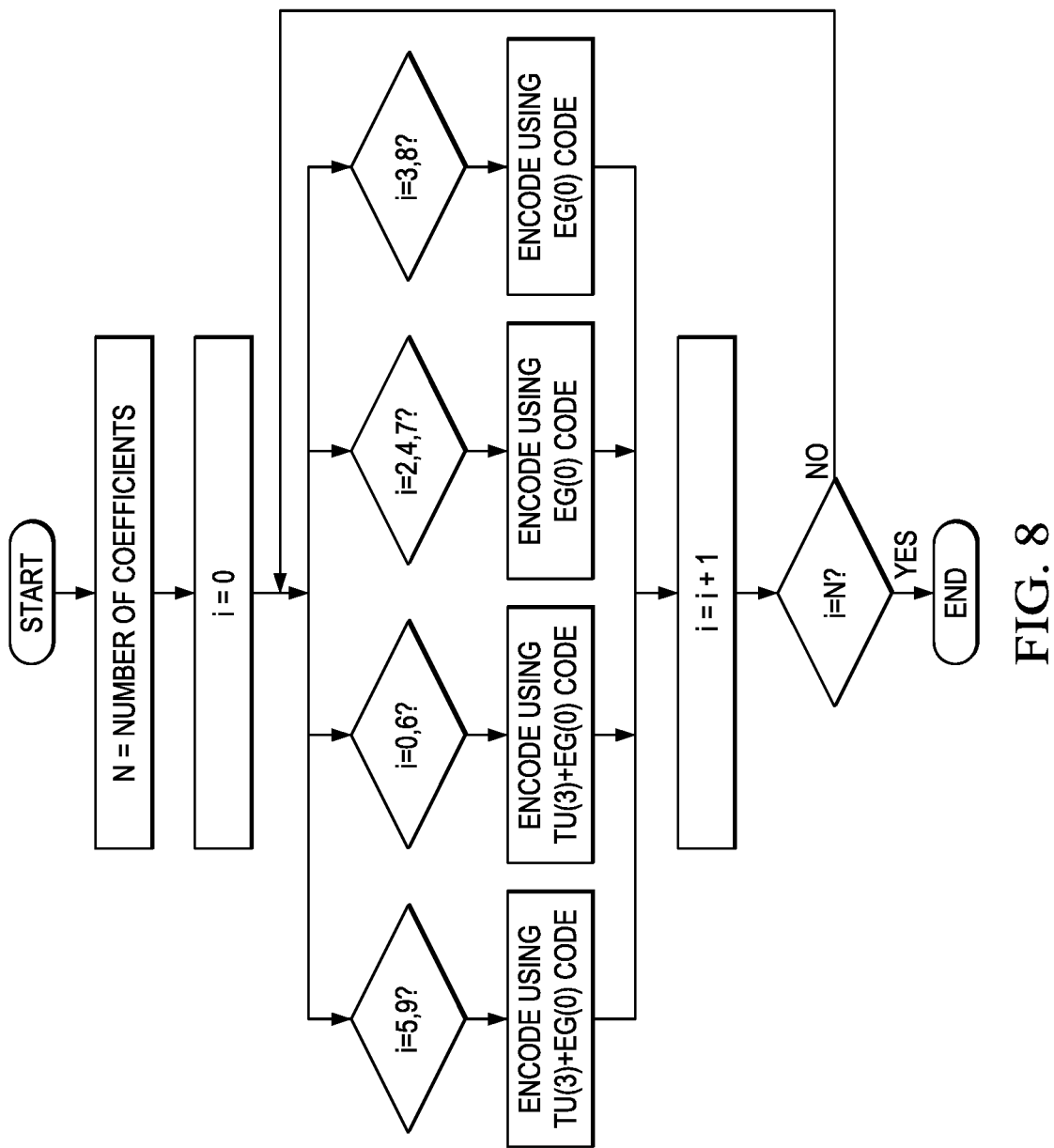
Figure 9:
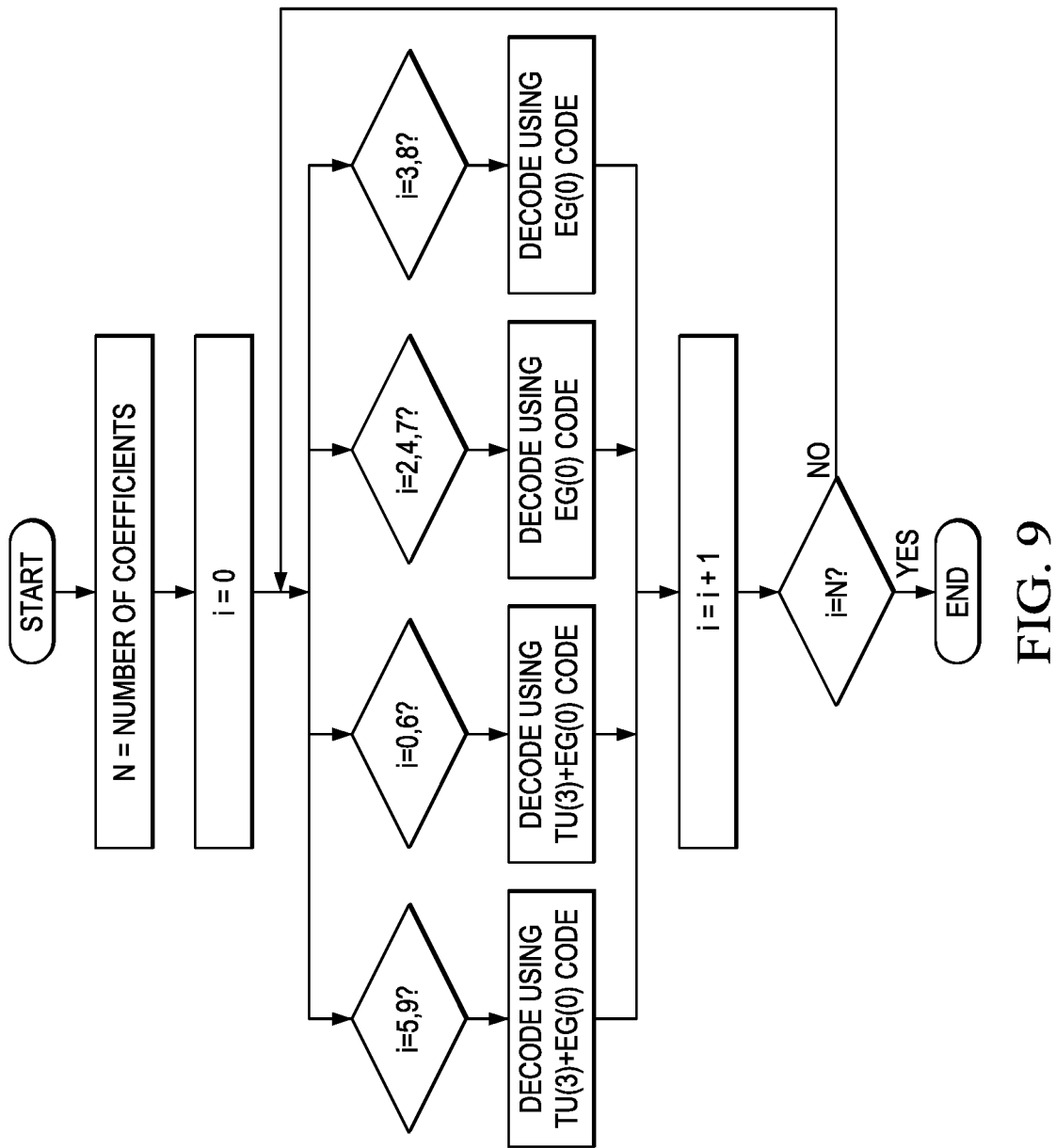

FIG. 8 is a flow diagram of a method for encoding ALF filter coefficients using a single coefficient position dependent short code, e.g., an exp-Golomb code of order k=0 (EG(0)), for some coefficient positions, and using a combination of coefficient position dependent short codes, i.e., truncated unary (TU) code in combination with exp-Golomb code, for other coefficient positions, e.g., a combination of a TU of order S=3 (TU(3)) and EG(0). FIG. 9 is a flow diagram of the corresponding method for decoding ALF filter coefficients encoded using the method of FIG. 8. Table 3 shows the values of k and S (where applicable) for each coefficient position and the maximum codeword length for the coefficient position. Table 4 is the code table for TU3+EG(0). The particular values of k and S shown in FIGS. 8 and 9 and in Table 3 for each coefficient position are examples. Other suitable values may be used. For example, the values of k and S may be determined as described above in reference to FIGS. 6 and 7. The particular use of EG(0) alone or TU(3) in combination with EG(0) for a coefficient position are also examples. For this example, TU(3) in combination with EG(0) is used for coefficient positions with peaked distributions.

TABLE 2

| Syntax element | Filter coefficient | Coefficient value range | k | Max length (in bits) |
|---|---|---|---|---|
| alf_filt_coeff[0] | C0 | −256 to 255 | 1 | 17 |
| alf_filt_coeff[1] | C1 | −256 to 255 | 2 | 16 |
| alf_filt_coeff[2] | C2 | −256 to 255 | 3 | 15 |
| alf_filt_coeff[3] | C3 | −256 to 255 | 4 | 14 |
| alf_filt_coeff[4] | C4 | −256 to 255 | 3 | 15 |
| alf_filt_coeff[5] | C5 | −256 to 255 | 1 | 17 |
| alf_filt_coeff[6] | C6 | −256 to 255 | 3 | 15 |
| alf_filt_coeff[7] | C7 | −256 to 255 | 3 | 15 |
| alf_filt_coeff[8] | C8 | −256 to 255 | 5 | 13 |
| alf_filt_coeff[9] | C9 | 0 to 511 | 0 | 20 |

TABLE 3

| Syntax element | Filter coefficient | Entropy coding technique | Coefficient value range | Max length (in bits) |
|---|---|---|---|---|
| alf_filt_coeff[0] | C0 | TU3 + EG0 | −256 to 255 | 20 |
| alf_filt_coeff[1] | C1 | EG0 | −256 to 255 | 17 |
| alf_filt_coeff[2] | C2 | EG0 | −256 to 255 | 17 |
| alf_filt_coeff[3] | C3 | EG0 | −256 to 255 | 17 |
| alf_filt_coeff[4] | C4 | EG0 | −256 to 255 | 17 |
| alf_filt_coeff[5] | C5 | TU3 + EG0 | −256 to 255 | 20 |
| alf_filt_coeff[6] | C6 | TU3 + EG0 | −256 to 255 | 20 |
| alf_filt_coeff[7] | C7 | EG0 | −256 to 255 | 17 |
| alf_filt_coeff[8] | C8 | EG0 | −256 to 255 | 17 |
| alf_filt_coeff[9] | C9 | TU3 + EG0 | 0 to 511 | 20 |

TABLE 4

| Input Value | TU prefix | EG prefix | Codeword suffix | Prefix code length | Suffix code length | Total codeword length |
|---|---|---|---|---|---|---|
| 0 | 0 | | | 1 | 0 | 1 |
| 1 | 10 | | | 2 | 0 | 2 |
| 2 | 110 | | | 3 | 0 | 3 |
| 3 | 111 | 0 | | 4 | 0 | 4 |
| 4~5 | 111 | 10 | x | 5 | 1 | 6 |
| 6~9 | 111 | 110 | xx | 6 | 2 | 8 |
| 10~17 | 111 | 1110 | xxx | 7 | 3 | 10 |
| 18~33 | 111 | 11110 | xxxx | 8 | 4 | 12 |
| 34~65 | 111 | 111110 | xxxxx | 9 | 5 | 14 |
| 66~129 | 111 | 1111110 | xxxxxx | 10 | 6 | 16 |
| 130~257 | 111 | 11111110 | xxxxxxx | 11 | 7 | 18 |
| 258~513 | 111 | 111111110 | xxxxxxxx | 12 | 8 | 20 |
| 514~1025 | 111 | 1111111110 | xxxxxxxxx | 13 | 9 | 22 |
| 1026~2049 | 111 | 11111111110 | xxxxxxxxxx | 14 | 10 | 24 |

TABLE 4-continued

| Input Value | TU prefix | EG prefix | Codeword suffix | Prefix code length | Suffix code length | Total codeword length |
|---|---|---|---|---|---|---|
| 2050–4097 | 111 | 111111111110 | xxxxxxxxxxx | 15 | 11 | 26 |
| 4098–8193 | 111 | 1111111111110 | xxxxxxxxxxxx | 16 | 12 | 28 |
| 8194–16385 | 111 | 11111111111110 | xxxxxxxxxxxxx | 17 | 13 | 30 |
| 16386–32769 | 111 | 111111111111110 | xxxxxxxxxxxxxx | 18 | 14 | 32 |

Figure 10:
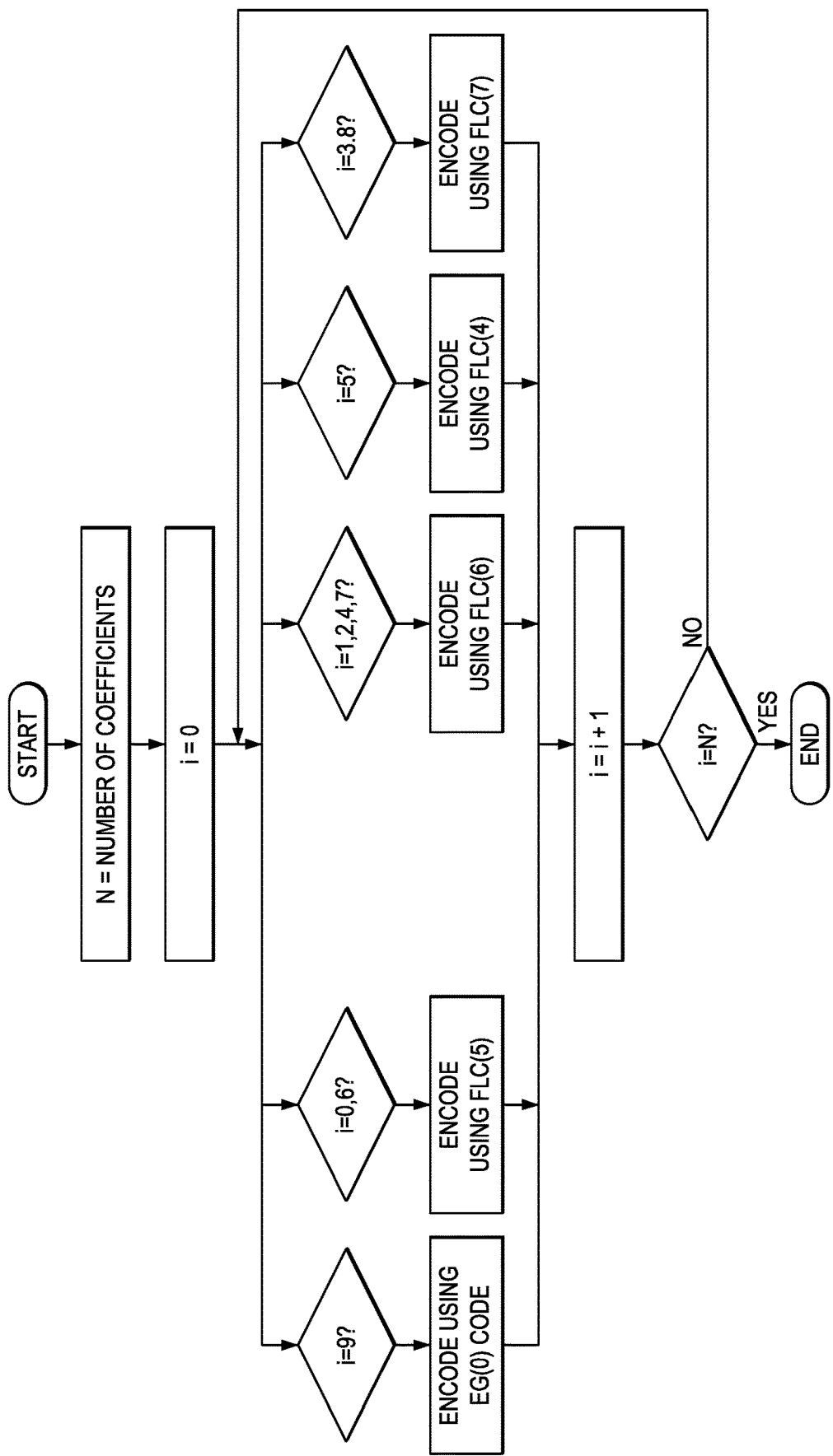
Figure 11:
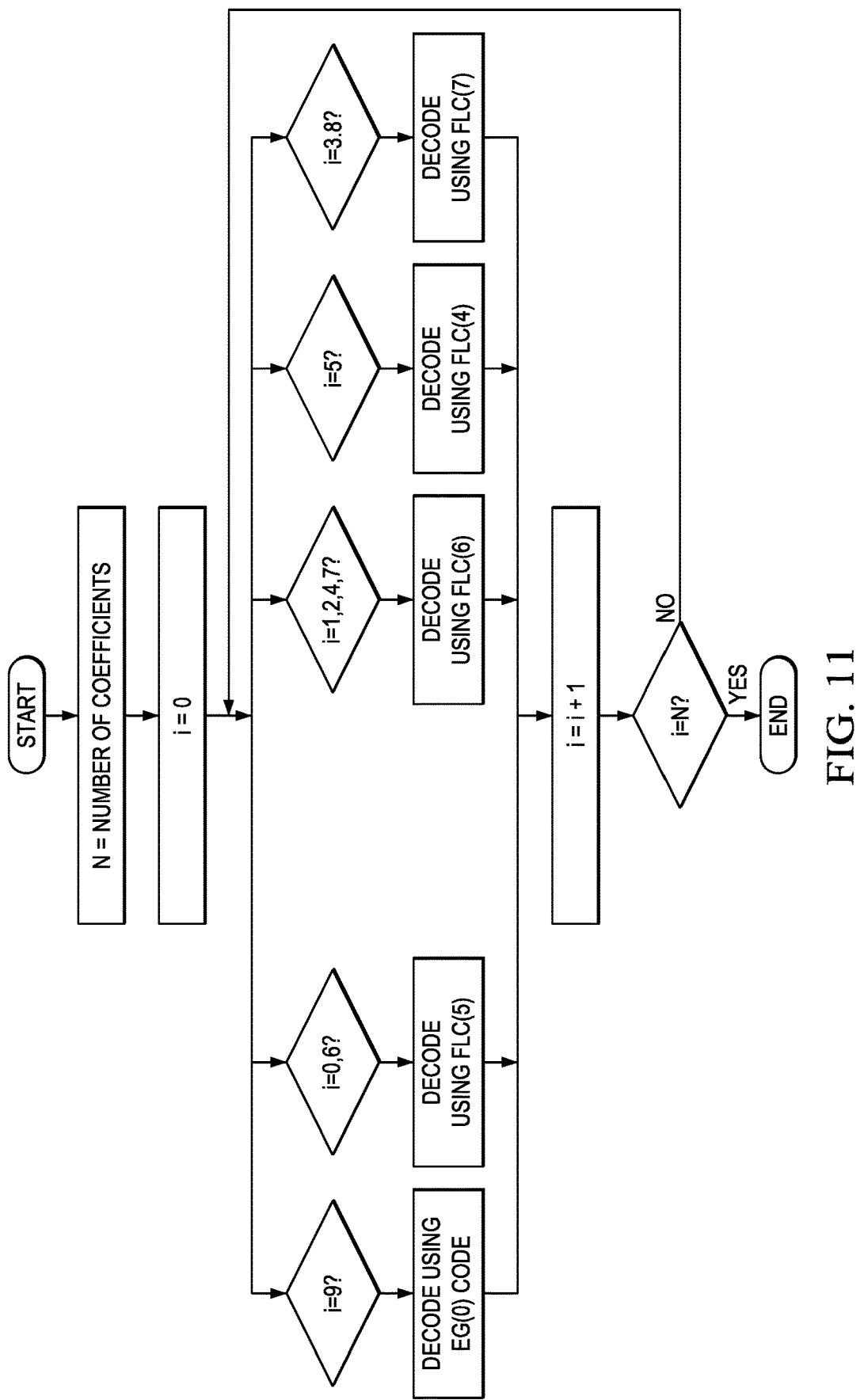
Figure 12:
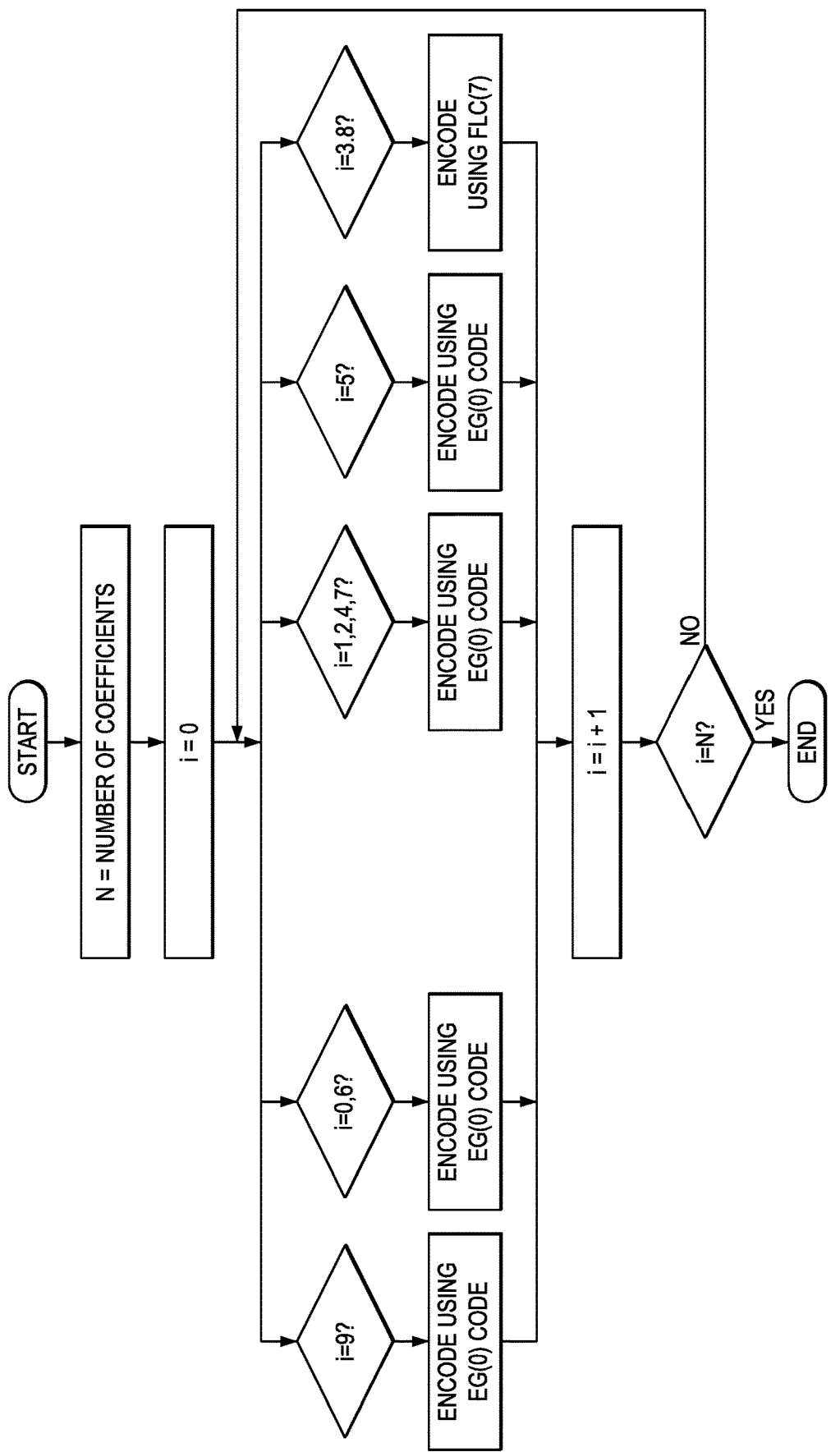
Figure 13:
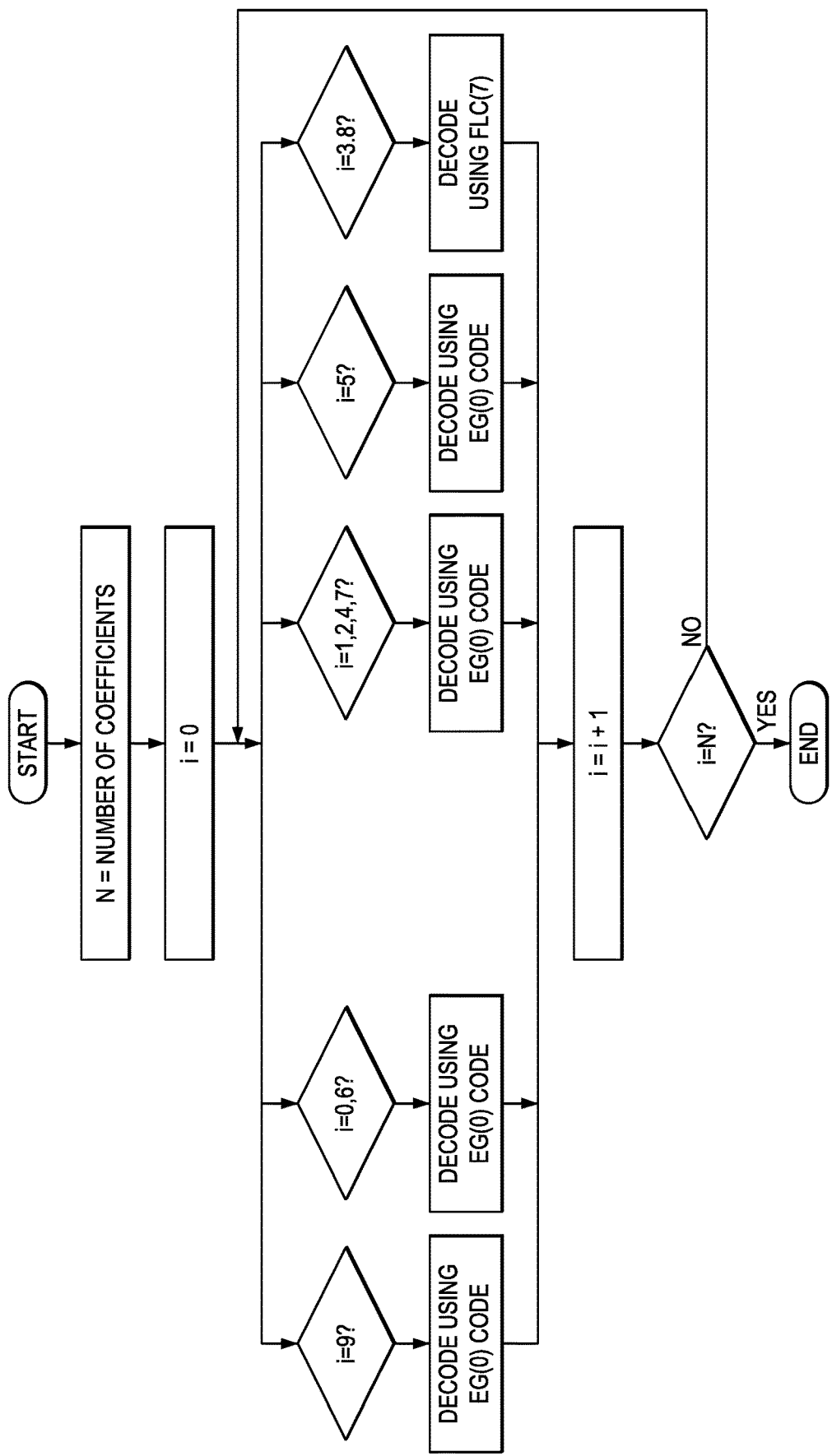

FIGS. 10 and 12 are flow diagrams of a method for encoding ALF filter coefficients using a combination of coefficient position dependent short codes, i.e., exp-Golomb codes for some coefficient positions, where the value of k depends on the position, and fixed length codes (FLC) of order S for other coefficient positions, where the value of S depends on the position. FIGS. 11 and 13 are flow diagrams of the corresponding methods for decoding ALF filter coefficients encoded using the respective methods of FIGS. 10 and 12. Tables 5 and 6 show the values of k or S for each coefficient position. The range of the coefficient values in these tables differs from those of the other tables as this particular technique was tested in a version of ALF in which ALF coefficient values were quantized before encoding. The particular values of k and S shown in FIGS. 10-13 and Tables 5 and 6, and the use of FLC or exp-Golomb for the particular coefficient positions are examples. Other suitable values of k and S may be used. For example, the values of k and S may be determined as described above in reference to FIGS. 6 and 7. Further, the particular code used for any given coefficient may be different. As will be understood by one of ordinary skill in the art, the values of k, S, and the use of FLC or exp-Golomb may be differ for versions in which the ALF coefficient values are not quantized. For these examples, exp-Golomb was selected for coefficient positions having values with a peaked distribution and FLC was selected for coefficient position having values with a flat distribution.

TABLE 5

| Syntax element | Filter coefficient | Entropy coding technique | Coefficient value range |
|---|---|---|---|
| alf_filt_coeff[0] | C0 | FLC5 | −16 to 15 |
| alf_filt_coeff[1] | C1 | FLC6 | −32 to 31 |
| alf_filt_coeff[2] | C2 | FLC6 | −32 to 31 |
| alf_filt_coeff[3] | C3 | FLC7 | −64 to 63 |
| alf_filt_coeff[4] | C4 | FLC6 | −32 to 31 |
| alf_filt_coeff[5] | C5 | FLC4 | −8 to 7 |
| alf_filt_coeff[6] | C6 | FLC5 | −16 to 15 |
| alf_filt_coeff[7] | C7 | FLC6 | −32 to 31 |
| alf_filt_coeff[8] | C8 | FLC7 | −64 to 63 |
| alf_filt_coeff[9] | C9 | EG0 | 0 to 511 |

TABLE 6

| Syntax element | Filter coefficient | Entropy coding technique | Coefficient value range |
|---|---|---|---|
| alf_filt_coeff[0] | C0 | EG0 | −256 to 255 |
| alf_filt_coeff[1] | C1 | EG0 | −256 to 255 |
| alf_filt_coeff[2] | C2 | EG0 | −256 to 255 |
| alf_filt_coeff[3] | C3 | FLC7 | −64 to 63 |
| alf_filt_coeff[4] | C4 | EG0 | −256 to 255 |
| alf_filt_coeff[5] | C5 | EG0 | −256 to 255 |
| alf_filt_coeff[6] | C6 | EG0 | −256 to 255 |
| alf_filt_coeff[7] | C7 | EG0 | −256 to 255 |
| alf_filt_coeff[8] | C8 | FLC7 | −64 to 63 |
| alf_filt_coeff[9] | C9 | EG0 | 0 to 511 |

Figure 14:
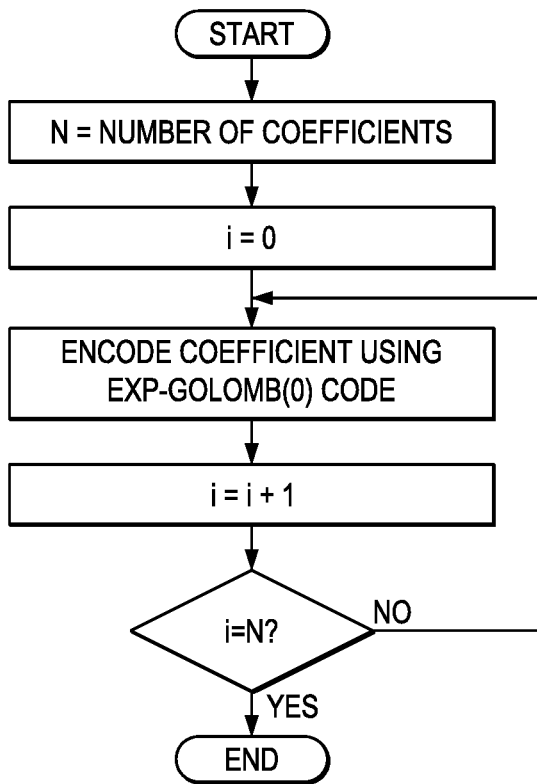
Figure 15:
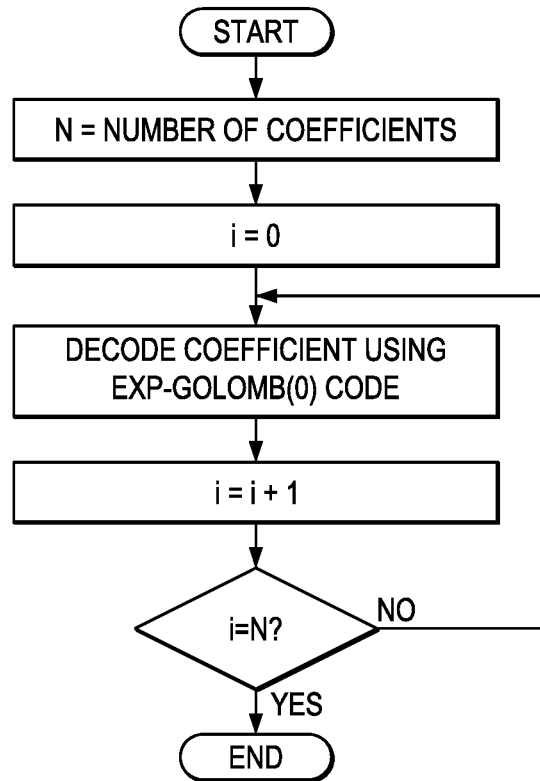

FIG. 14 is a flow diagram of a method for encoding ALF filter coefficients using coefficient position independent short codes, e.g., exp-Golomb codes of order k=0, . . . , 5, where the value of k is fixed for all coefficient positions. FIG. 15 is a flow diagram of the corresponding method for decoding ALF filter coefficients encoded using the method of FIG. 14. The particular value of k shown in FIGS. 14 and 15 is an example. Other suitable values may be used. For example, the value of k may be determined empirically using a representative set of video sequences, i.e., experiments may be conducted with different values of k to find the value with the least distortion.

Figure 16:
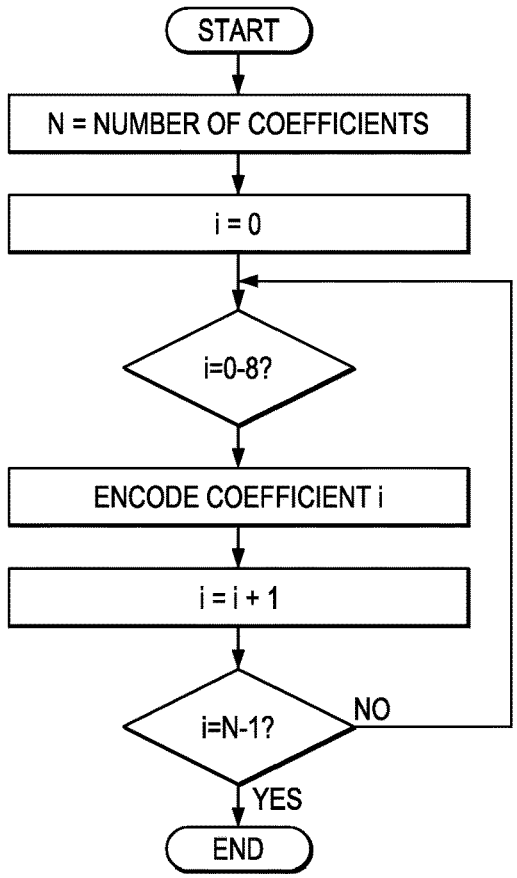
Figure 17:
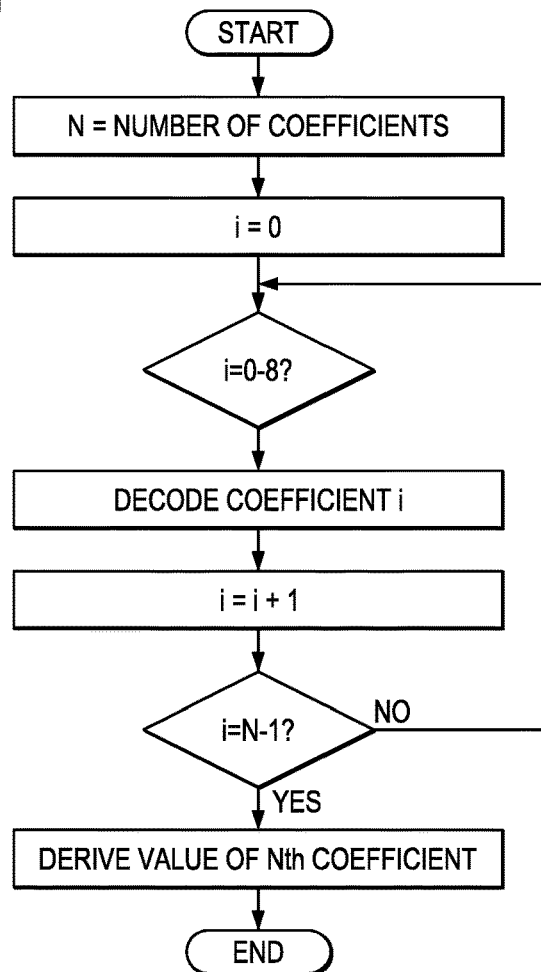

FIG. 16 is a flow diagram of a method for encoding ALF filter coefficients in which no information is encoded for one of the coefficient positions, thus reducing the number of bits needed to encode the ALF coefficients. In this method, the symmetric filter is constrained to be a unit gain filter such that the sum of the coefficients is 1.0 (or some fixed point representation of 1.0, i.e., C0+C1+C2+C3+C4+C5+C6+C7+C8+C9=1.0. Thus, given the values of nine of the coefficients, the tenth one may be derived. In this example, the coefficient value at position C9 is not encoded. Thus, given the values of C0, C1, C2, C3, C4, C5, C6, C7, C8, the value of C9 can be derived in the decoder as C9=1.0−C0+C1+C2+C3+C4+C5+C6+C7+C8, thus eliminating the need to encode a value for C9. FIG. 17 is a flow diagram of a corresponding method for decoding ALF filter coefficients encoded using the method of FIG. 16. One of ordinary skill in the art will understand embodiments of these methods for other filter shapes where the center coefficient (or any other predetermined coefficient position) can be calculated from the remaining coefficients. In some embodiments, these methods may be used in conjunction with one of the above described short code encoding/decoding method pairs.

Figure 18:
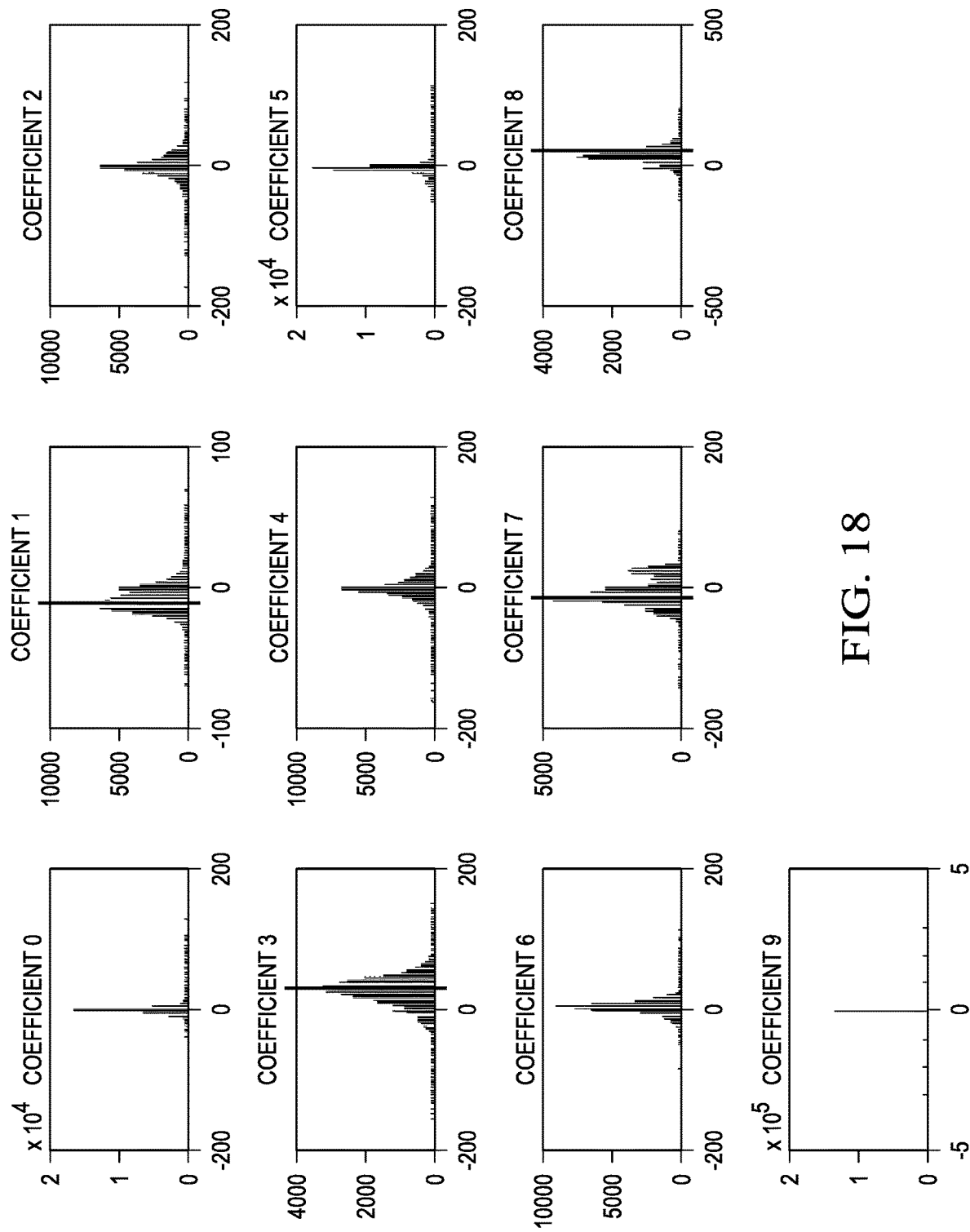
FIGS. 18 and 19 are examples of the distributions of ALF coefficient values.
Figure 19:
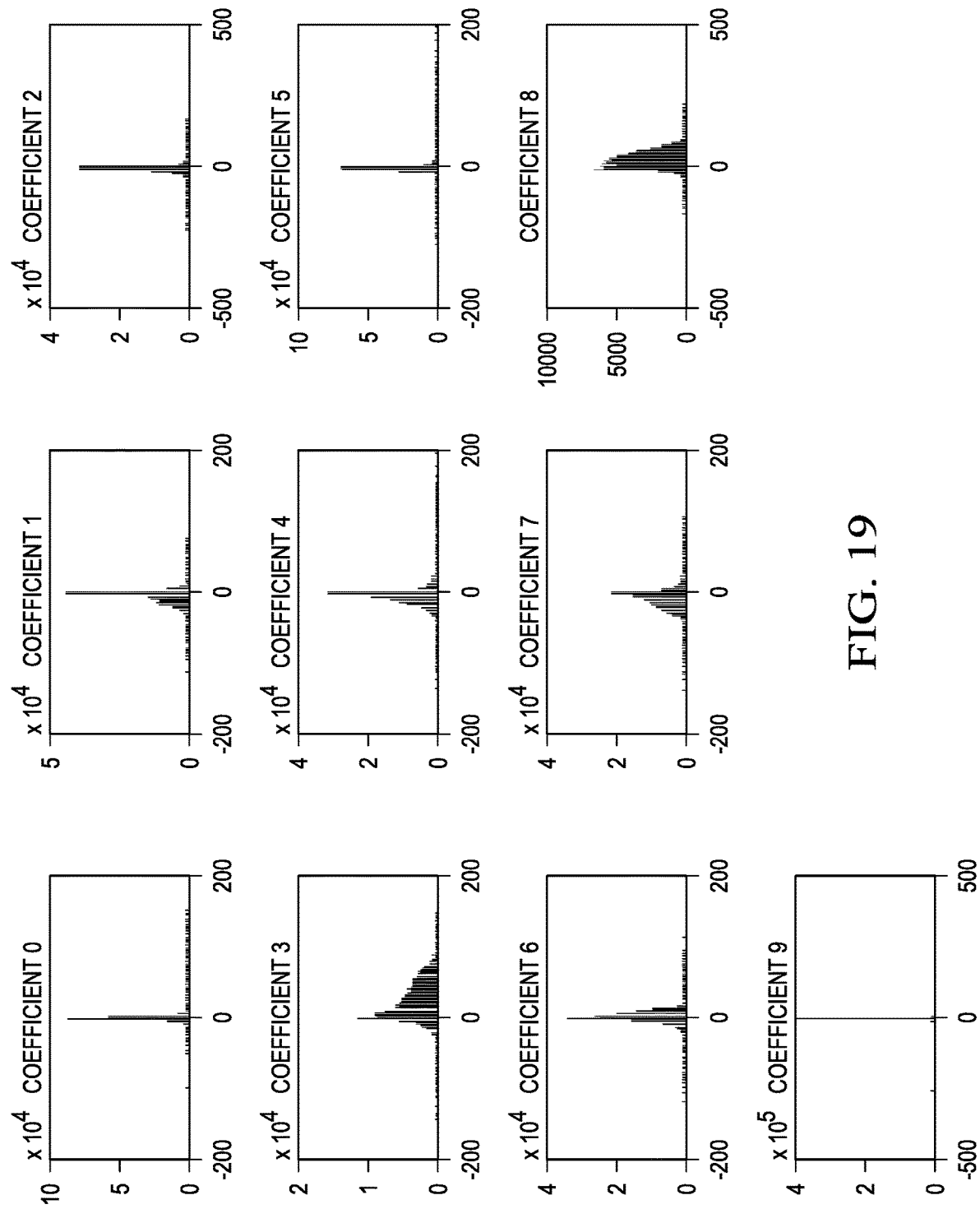

As currently proposed in HEVC, the values of the ALF coefficients for positions 0-8 for chroma are coded without considering any bias present in the chroma ALF coefficient values. Similarly, the values of the ALF coefficients for luma are coded without considering any bias in these coefficient values. FIG. 18 illustrates the distributions of the chroma ALF coefficients for a representative set of video sequences. As this figure shows, there is a bias in the chroma coefficient values, especially for coefficient positions 3 and 8, which have a bias around 30, and coefficient positions 1 and 7, which have a bias around −10. FIG. 19 illustrates the distributions of the luma ALF coefficients for a representative set of video sequences. Removing or reducing the bias prior to entropy coding will increase coding efficiency.

Figure 20:
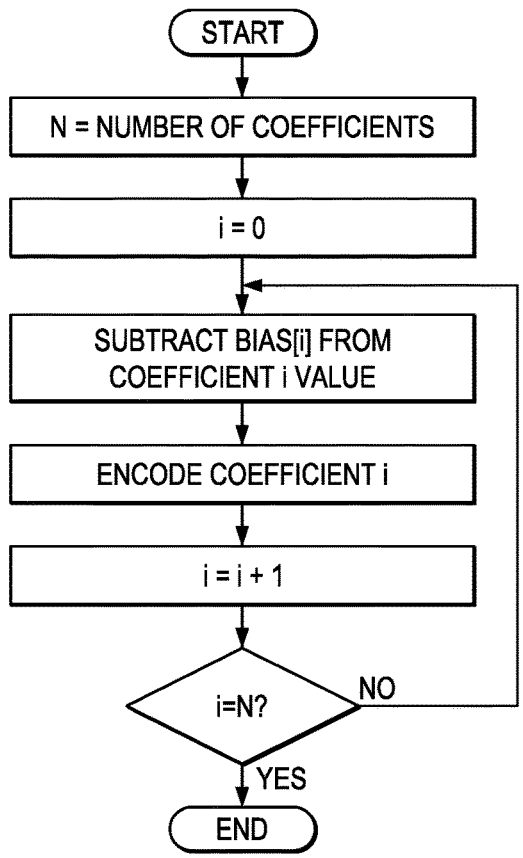
Figure 21:
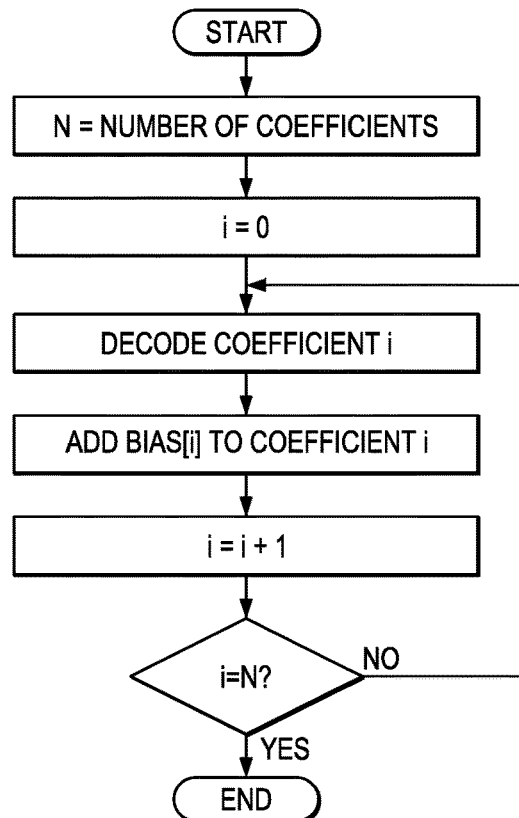

FIG. 20 is a flow diagram of a method for encoding ALF filter coefficients in which the bias is removed or reduced prior to entropy coding the values. This method may be used for both luma filter coefficients and chroma filter coefficients. FIG. 21 is a flow diagram of a corresponding method for decoding ALF filter coefficients encoded using the method of FIG. 20. Note that in the method of FIG. 20, a bias is subtracted from each coefficient value prior to encoding, and in the method of FIG. 21, the bias is added back to each coefficient value after the bias-reduced value is decoded. In this embodiment, a unique bias value is assumed for each coefficient position. Note that some of the bias values may be 0. In some embodiments, the bias values used by the encoder and the decoder are defined by the coding standard. In some embodiments, the encoder signals the bias values to the encoder, e.g., at the sequence level. In some embodiments, these methods may be used in conjunction with one of the above described short code encoding/decoding method pairs. In some embodiments, these methods may be used in conjunction with one of the above described short code encoding/decoding method pairs and the encoding/decoding method pair of FIGS. 16 and 17.

ALF coefficients values may be negative or positive. Further, the negative values can have a different distribution than the positive values. For example, in FIG. 19, the positive values of coefficient position 8 have a fat tailed distribution whereas the negative values have a thin tailed distribution. Thus, a unified entropy coding technique that codes negative and positive values with different order entropy codes matched to the distribution may be used. For example, negative values can be coded with EG(0), and the positive values can be coded with EG(4) or vice versa. In another example, the negative values can be coded with a unary code, and positive values can be coded with EG(4) or vice versa.

Figure 22:
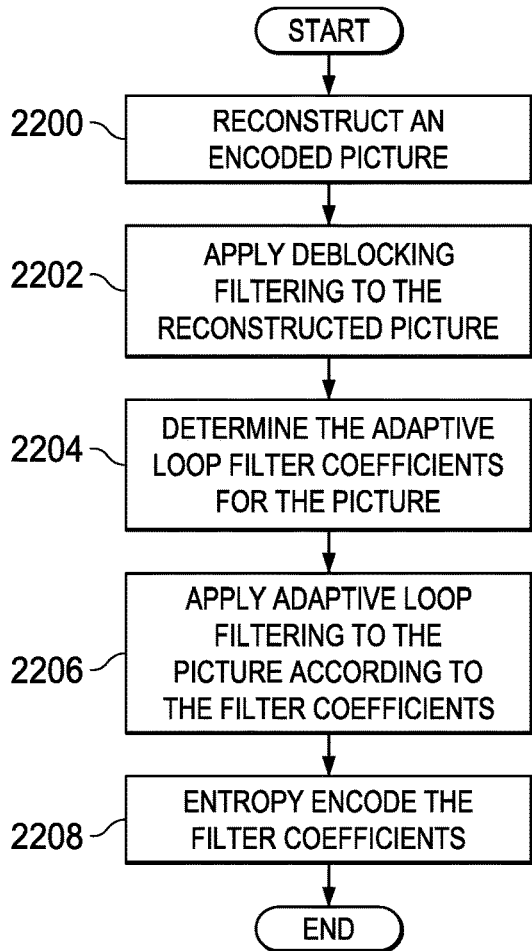

FIG. 22 shows a flow diagram of a method for adaptive loop filtering of a reconstructed picture in a video encoder. Initially, an encoded picture is reconstructed 2200 in the embedded decoder of the video encoder. Deblocking filtering is then applied 2202 to the reconstructed picture. One or more sets of filter coefficients for the adaptive loop filter are then determined 2204 for the picture. The determination of the set(s) of filter coefficients may be performed using any suitable technique. Adaptive loop filtering is then applied 2206 to the reconstructed picture according to the set(s) of filter coefficients. The sets of filter coefficients are then entropy encoded 2208 in the bit stream. The entropy encoding may be performed using an embodiment of one of the methods of FIGS. 6, 8, 10, 12, 14, 16, and 20. Further, the entropy encoding may be performed using an embodiment of one of the methods of FIGS. 6, 8, 10, 12, and 14 and an embodiment of the method of FIG. 16 and/or an embodiment of the method of FIG. 20.

Figure 23:
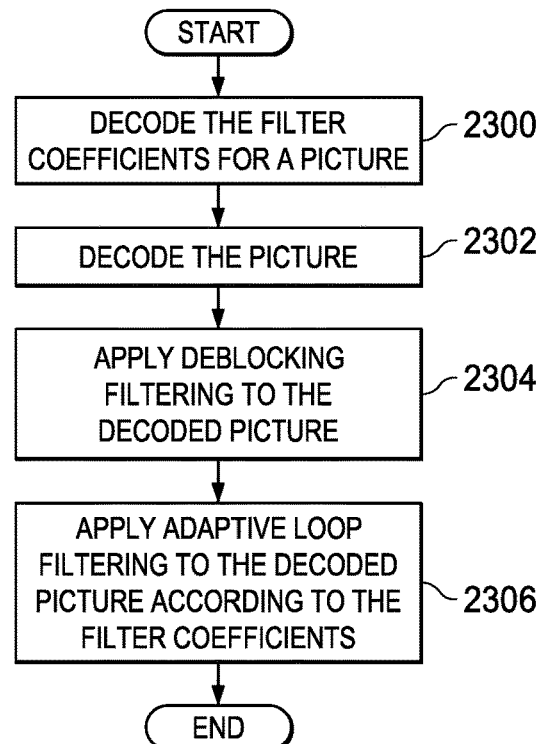

FIG. 23 shows a flow diagram of a method for adaptive loop filtering of a reconstructed picture in a video decoder. Initially, the set(s) of filter coefficients for a picture are entropy decoded 2300 from the encoded bit stream. The entropy decoding performs the inverse to the entropy encoding performed by the encoder that generated the bit stream. The entropy decoding may be performed using an embodiment of one of the methods of FIGS. 7, 9, 11, 13, 15, 17, and 21. Further, the entropy decoding may be performed using an embodiment of one of the methods of FIGS. 7, 9, 11, 13, and 15, and an embodiment of the method of FIG. 17 and/or an embodiment of the method of FIG. 21. The picture is also decoded 2302 from the encoded bit stream. Deblocking filtering is applied 2304 to the reconstructed picture, followed by adaptive loop filtering 2306 according to the set(s) of filter coefficients.

Figure 24:
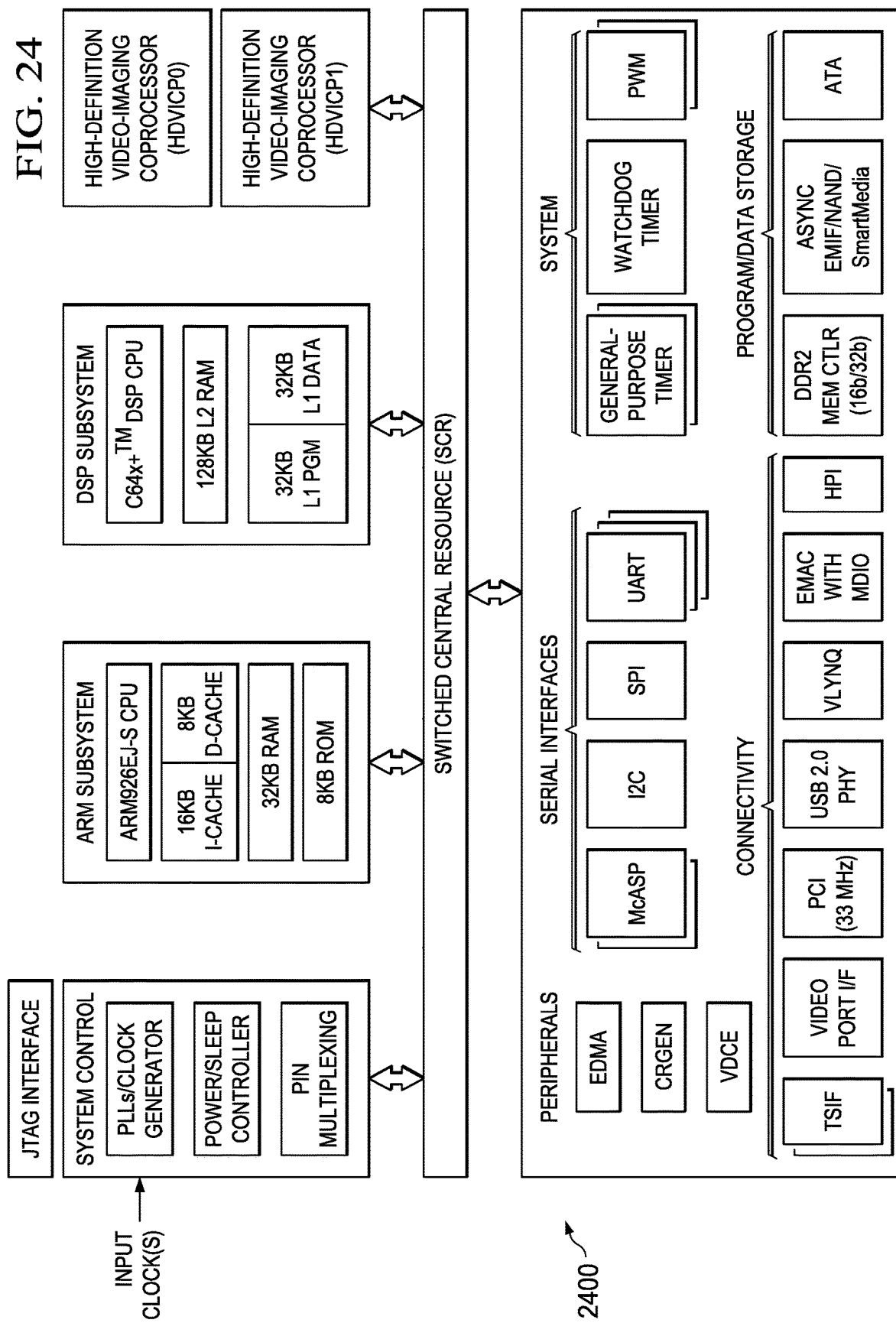
FIG. 24 is a block diagram of an illustrative digital system.

Embodiments of the methods, encoders, and decoders described herein may be implemented for virtually any type of digital system (e.g., a desk top computer, a laptop computer, a tablet computing device, a netbook computer, a handheld device such as a mobile (i.e., cellular) phone, a personal digital assistant, a digital camera, etc.). FIG. 24 is a block diagram of an example digital system suitable for use as an embedded system that may be configured to entropy encode ALF coefficients as described herein during encoding of a video stream and/or entropy decode ALF coefficients as described herein during decoding of an encoded video bit stream. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 2400 is a programmable platform designed to meet the processing needs of applications such as video encode/decode/transcode/transrate, video surveillance, video conferencing, set-top box, medical imaging, media server, gaming, digital signage, etc. The SoC 2400 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 2400 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 2400, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 2400 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 24, the SoC 2400 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, intra-prediction, transformation, quantization, and in-loop filtering. Further, the distinct circuitry in the HDVICP coprocessors that may be used for specific computation operations is designed to operate in a pipeline fashion under the control of the ARM subsystem and/or the DSP subsystem.

As was previously mentioned, the SoC 2400 may be configured to perform entropy encoding of ALF coefficients as described herein during encoding of a video stream and/or entropy decoding of ALF coefficients as described herein during decoding of an encoded video bit stream. For example, the coding control of the video encoder of FIG. 4 may be executed on the DSP subsystem or the ARM subsystem and at least some of the computational operations of the block processing, including the intra-prediction and inter-prediction of mode selection, transformation, quantization, and entropy encoding may be executed on the HDVICP coprocessors. At least some of the computational operations of entropy encoding ALF coefficients during encoding of a video sequence may also be executed on the HDVICP coprocessors. Similarly, at least some of the computational operations of the various components of the video decoder of FIG. 5, including entropy decoding, inverse quantization, inverse transformation, intra-prediction, and motion compensation may be executed on the HDVICP coprocessors. Further, at least some of the computational operations of entropy decoding ALF coefficients during decoding of an encoded video bit stream may also be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method for adaptive loop filtering, the method comprising:
    determining a coefficient value of an adaptive loop filter;
    determining a bias of the coefficient value based on a coefficient position of the coefficient value;
    altering the coefficient value to remove the bias;
    applying the adaptive loop filter to at least a portion of a reconstructed picture using the altered coefficient value; and
    entropy encoding the altered coefficient value into a compressed bit stream using a short binary code, wherein the short binary code used depends on the coefficient position of the coefficient value.

2. The method of claim 1, wherein the short binary code is an exp-Golomb code, wherein an order k of the exp-Golomb code for a first coefficient position is different from an order k of the exp-Golomb code for a second coefficient position.

3. The method of claim 2, wherein the bias is determined based on a distribution of coefficient values at the coefficient position of the coefficient value.

4. The method of claim 2, wherein the adaptive loop filter is a unit gain filter and wherein a second coefficient value of a second coefficient position is not entropy encoded in the compressed bit stream.

5. The method of claim 1, further comprising signaling the bias for the coefficient in the compressed bit stream.

6. The method of claim 1, wherein the short binary code for a first coefficient position is different from the short binary code for a second coefficient position.

7. The method of claim 6, wherein the short binary code for the first coefficient is an exp-Golomb code and the short binary code for the second coefficient position is a combination of a truncated unary code and an exp-Golomb code.

8. The method of claim 6, wherein the short binary code for the first coefficient is an exp-Golomb code and the short binary code for the second coefficient position is a fixed length code.

9. A method for adaptive loop filtering, the method comprising:
    entropy decoding a coefficient value from a compressed video bit stream using a short binary code, wherein the short binary code used depends on a coefficient position of the coefficient value; and
    determining a bias of the coefficient value based on a coefficient position of the coefficient value;
    altering the coefficient value to add the bias;
    applying the adaptive loop filter to a portion of a reconstructed picture using the altered coefficient value.

10. The method of claim 9, wherein the short binary code is an exp-Golomb code, wherein an order k of the exp-Golomb code for a first coefficient position is different from an order k of the exp-Golomb code for a second coefficient position.

11. The method of claim 10, wherein the bias is determined based on a distribution of coefficient values at the coefficient position of the coefficient value.

12. The method of claim 10, wherein the adaptive loop filter is a unit gain filter and wherein a second coefficient value of a second coefficient position is not entropy encoded in the compressed bit stream and wherein the second coefficient value is derived from the entropy decoded coefficient values.

13. The method of claim 9, further comprising decoding the bias for the coefficient value from the compressed video bit stream.

14. The method of claim 9, wherein the short binary code for a first coefficient position is different from the short binary code for a second coefficient position.

15. The method of claim 14, wherein the short binary code for the first coefficient is an exp-Golomb code and the short binary code for the second coefficient position is a combination of a truncated unary code and an exp-Golomb code.

16. The method of claim 14, wherein the short binary code for the first coefficient is an exp-Golomb code and the short binary code for the second coefficient position is a fixed length code.

* * * * *